(12) United States Patent
Allen et al.

(10) Patent No.: US 12,710,111 B2
(45) Date of Patent: Aug. 18, 2026

(54) EXPANDING SYSTEMS FOR BREAK CHECK WATER DAMPENING

(71) Applicant: Mueller International, LLC, Atlanta, GA (US)

(72) Inventors: Sean Michael Allen, Chattanooga, TN (US); Sean Gant, Chattanooga, TN (US); David Latimore Hughes, Jr., Signal Mountain, TN (US); Walter Pierce Wojick, Lookout Mountain, GA (US); Christopher Joseph Duckett, Guntersville, AL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/812,055

(22) Filed: Aug. 22, 2024

(65) Prior Publication Data

US 2026/0055824 A1 Feb. 26, 2026

(51) Int. Cl.

*F16K 47/02* (2006.01)
*E03B 9/04* (2006.01)
*F16K 15/14* (2006.01)

(52) U.S. Cl.

CPC .............. *F16K 47/023* (2013.01); *E03B 9/04* (2013.01); *F16K 15/145* (2013.01)

(58) Field of Classification Search

CPC ............. F16K 7/10; F16K 47/023; E03B 9/04
See application file for complete search history.

(56) References Cited

U.S. PATENT DOCUMENTS

| | | | |
|---|---|---|---|
| 970,598 | A | 9/1910 | Arnold |
| 1,065,023 | A | 6/1913 | Blood |
| 1,487,038 | A | 3/1924 | Spencer |
| 2,054,561 | A | 9/1936 | Greenberg |
| 2,717,001 | A | 9/1955 | Perrault |
| 2,923,317 | A | 2/1960 | Mcinerney |
| 3,007,488 | A | 11/1961 | Wheeler, Jr. |
| 3,677,297 | A | 7/1972 | Walton |
| 3,831,429 | A | 8/1974 | Kmiecik |
| 4,005,732 | A | 2/1977 | Buckner |
| 4,079,751 | A | 3/1978 | Partridge et al. |
| 4,127,142 | A | 11/1978 | Snider |
| 4,230,148 | A | 10/1980 | Ogle, Jr. |
| 4,361,165 | A | 11/1982 | Flory |
| 4,543,977 | A | 10/1985 | Arav |
| 4,596,263 | A | 6/1986 | Snider |
| 4,607,661 | A | 8/1986 | Wessels et al. |
| 4,774,981 | A | 10/1988 | Mizusawa |

(Continued)

OTHER PUBLICATIONS

Allen, Sean Michael; Corrected Notice of Allowance for U.S. Appl. No. 16/428,742, filed May 31, 2019, mailed Aug. 31, 2021, 4 pgs.

(Continued)

*Primary Examiner* — Kevin F Murphy
(74) *Attorney, Agent, or Firm* — Smith, Gambrell & Russell, LLP

(57) ABSTRACT

A valve member for a break check valve coupled to a pipe system fitting includes a valve member positioned in fluid communication with a piping system and configured to move from an open position to a closed position in response to a break between the pipe system fitting and the break check valve.

30 Claims, 13 Drawing Sheets

(56) References Cited

U.S. PATENT DOCUMENTS

| | | | |
|---|---|---|---|
| 4,819,909 A | 4/1989 | Hart et al. | |
| 5,010,919 A | 4/1991 | Partridge | |
| 5,088,905 A | 2/1992 | Beagle | |
| 5,158,265 A | 10/1992 | Miyairi | |
| 5,301,709 A | 4/1994 | Gasaway | |
| 5,348,270 A * | 9/1994 | Dinh | F24F 13/10 137/553 |
| 5,509,437 A | 4/1996 | Merrett | |
| 5,609,179 A | 3/1997 | Knapp | |
| 5,711,343 A | 1/1998 | Beckett | |
| 6,029,949 A | 2/2000 | Brown et al. | |
| 6,726,176 B2 | 4/2004 | Bauman | |
| 6,851,255 B2 | 2/2005 | Aitchison et al. | |
| 7,128,083 B2 * | 10/2006 | Fleury, Jr. | F16K 47/023 137/71 |
| 7,152,622 B2 | 12/2006 | Scaramucci et al. | |
| 8,540,207 B2 | 9/2013 | Hunnicutt et al. | |
| 8,991,415 B1 | 3/2015 | Luppino | |
| 9,347,573 B2 | 5/2016 | Feng et al. | |
| 9,353,878 B2 | 5/2016 | Plummer et al. | |
| 9,360,133 B2 * | 6/2016 | Kennedy | F16K 31/122 |
| 9,447,889 B2 * | 9/2016 | Al Shammary | F16L 55/124 |
| 9,486,884 B2 | 11/2016 | Dominguez et al. | |
| 9,581,256 B2 | 2/2017 | Barone | |
| 9,890,866 B2 | 2/2018 | Kitchen et al. | |
| 10,228,070 B2 | 3/2019 | Minta | |
| 10,407,882 B2 | 9/2019 | Kitchen et al. | |
| 10,539,244 B2 | 1/2020 | Solarz et al. | |
| 10,578,224 B2 | 3/2020 | Reszewicz et al. | |
| 10,612,690 B2 | 4/2020 | Lesniewski | |
| 10,640,956 B2 | 5/2020 | Kennedy | |
| 11,156,303 B2 | 10/2021 | Allen et al. | |
| 11,204,102 B2 | 12/2021 | Allen et al. | |
| 11,268,644 B2 * | 3/2022 | Van Beugen | F16K 7/10 |
| 11,635,150 B2 | 4/2023 | Allen et al. | |
| 11,644,113 B2 | 5/2023 | Allen et al. | |
| 11,725,746 B2 | 8/2023 | Allen et al. | |
| 11,841,087 B2 | 12/2023 | Allen et al. | |
| 2005/0224114 A1 | 10/2005 | Cook et al. | |
| 2007/0044847 A1 | 3/2007 | Yang | |
| 2007/0256740 A1 | 11/2007 | Sugai et al. | |
| 2008/0072973 A1 | 3/2008 | Mcgonigle et al. | |
| 2008/0078459 A1 | 4/2008 | Warriner et al. | |
| 2008/0135100 A1 | 6/2008 | Davidson et al. | |
| 2012/0160346 A1 | 6/2012 | Shelcoviz et al. | |
| 2015/0240962 A1 | 8/2015 | Plummer | |
| 2016/0265197 A1 | 9/2016 | Kitchen et al. | |
| 2017/0268696 A1 | 9/2017 | Lesniewski | |
| 2018/0171606 A1 | 6/2018 | Kitchen | |
| 2020/0378508 A1 | 12/2020 | Allen et al. | |
| 2021/0293340 A1 | 9/2021 | Allen et al. | |
| 2021/0404567 A1 | 12/2021 | Allen et al. | |
| 2022/0074512 A1 | 3/2022 | Allen et al. | |
| 2022/0390037 A1 | 12/2022 | Allen et al. | |
| 2023/0167913 A1 | 6/2023 | Allen et al. | |
| 2025/0305589 A1 | 10/2025 | Allen et al. | |
| 2026/0055842 A1 | 2/2026 | Allen et al. | |

OTHER PUBLICATIONS

Allen, Sean Michael; Corrected Notice of Allowance for U.S. Appl. No. 16/428,742, filed May 31, 2019, mailed Sep. 20, 2021, 6 pgs.
Allen, Sean Michael; Corrected Notice of Allowance for U.S. Appl. No. 16/428,742, filed May 31, 2019, mailed Sep. 24, 2021, 2 pgs.
Allen, Sean Michael; Non-Final Office Action for U.S. Appl. No. 16/428,742, filed May 31, 2019, mailed Feb. 19, 2021, 25 pgs.
Allen, Sean Michael; Notice of Allowance for U.S. Appl. No. 16/428,742, filed May 31, 2019, mailed Jun. 14, 2021, 11 pgs.
Clow Valve Co.; Images of Clow Valve, publicly available prior to May 31, 2019, 3 pgs.
Mueller; Brochure for Jones Tell-Tale Break-Off Check Valve, published Oct. 2018, 1 pg.
Mueller; Installation Instructions for J-5000 Break Check Valve, published Oct. 2018, 1 pg.
Allen, Sean Michael; Applicant-Initiated Interview Summary for U.S. Appl. No. 17/473,542, filed Sep. 13, 2021, mailed Nov. 17, 2022, 3 pgs.
Allen, Sean Michael; Non-Final Office Action for U.S. Appl. No. 17/473,542, filed Sep. 13, 2021, mailed Sep. 27, 2022, 24 pgs.
Allen, Sean Michael; Notice of Allowance for U.S. Appl. No. 17/473,542, filed Sep. 13, 2021, mailed Jan. 27, 2023, 13 pgs.
Allen, Sean Michael; Applicant-Initiated Interview Summary for U.S. Appl. No. 16/824,147, filed Mar. 19, 2020, mailed Feb. 16, 2021, 8 pgs.
Allen, Sean Michael; Applicant-Initiated Interview Summary for U.S. Appl. No. 16/824,147, filed Mar. 19, 2020, mailed Jul. 2, 2021, 7 pgs.
Allen, Sean Michael; Final Office Action for U.S. Appl. No. 16/824,147, filed Mar. 19, 2020, mailed May 18, 2021, 19 pgs.
Allen, Sean Michael; Non-Final Office Action for U.S. Appl. No. 16/824,147, filed Mar. 19, 2020, mailed Jan. 21, 2021, 20 pgs.
Allen, Sean Michael; Notice of Allowance for U.S. Appl. No. 16/824,147, filed Mar. 19, 2020, mailed Aug. 16, 2021, 7 pgs.
Allen, Sean Michael; Supplemental Notice of Allowance for U.S. Appl. No. 16/824,147, filed Mar. 19, 2020, mailed Sep. 2, 2021, 6 pgs.
Allen, Sean Michael; Non-Final Office Action for U.S. Appl. No. 17/526,630, filed Nov. 15, 2021, mailed Aug. 1, 2022, 25 pgs.
Allen, Sean Michael; Notice of Allowance for U.S. Appl. No. 17/526,630, filed Nov. 15, 2021, mailed Nov. 1, 2022, 7 pgs.
Allen, Sean Michael; Applicant-Initiated Interview Summary for U.S. Appl. No. 18/102,466, filed Jan. 27, 2023, mailed Jul. 25, 2023, 3 pgs.
Allen, Sean Michael; Non-Final Office Action for U.S. Appl. No. 18/102,466, filed Jan. 27, 2023, mailed May 4, 2023, 27 pgs.
Allen, Sean Michael; Notice of Allowance for U.S. Appl. No. 18/102,466, filed Jan. 27, 2023, mailed Aug. 10, 2023, 9 pgs.
Mueller; Brochure for J6000 Series Break Check, Copyright 2019, 2 pgs.
Allen, Sean Michael; Applicant-Initiated Interview Summary for U.S. Appl. No. 17/340,659, filed Jun. 7, 2021, mailed Jan. 23, 2023, 2 pgs.
Allen, Sean Michael; Non-Final Office Action for U.S. Appl. No. 17/340,659, filed Jun. 7, 2021, mailed Nov. 21, 2022, 23 pgs.
Allen, Sean Michael; Notice of Allowance for U.S. Appl. No. 17/340,659, filed Jun. 7, 2021, mailed Apr. 3, 2023, 13 pgs.
McMaster-Carr; Article entitled: 3D Printer Nozzle, Steel Tip, V6, 0.25 mm Opening Diameter, accessed on Feb. 15, 2024, 2 pgs.
McMaster-Carr; Article entitled: High-Pressure Inline Filter, 303 Stainless Steel Housing, 1/8 NPT Female x Male, 25 Microns, accessed on Feb. 15, 2024, 2 pgs.
Mueller; Brochure for J7000 Series Break Check, publicly available before Aug. 22, 2023, 2 pgs.
Clow Valve Co.; Brochure for LP619 Break-Off Check Valve, publicly available by Aug. 27, 2019, 2 pgs.
Clow Valve Company; Specification Sheet for LP619 Low Profile Break Off Check Valve, publicly available by Aug. 27, 2019, 1 pg.
Allen, Sean Michael; Non-Final Office Action for U.S. Appl. No. 18/616,301, filed Mar. 26, 2024, mailed Jul. 17, 2025, 27 pgs.
Allen, Sean Michael; Requirement for Restriction/Election for U.S. Appl. No. 18/616,301, filed Mar. 26, 2024, mailed May 8, 2025, 6 pgs.
Allen, Sean Michael; Final Office Action for U.S. Appl. No. 18/616,301, filed Mar. 26, 2024, mailed Nov. 5, 2025, 15 pgs.
Allen, Sean Michael; Non-Final Office Action for U.S. Appl. No. 18/812,068, filed Aug. 22, 2024, mailed Nov. 24, 2025, 23 pgs.
Allen, Sean Michael; Requirement for Restriction/Election for U.S. Appl. No. 18/812,068, filed Aug. 22, 2024, mailed Sep. 4, 2025, 6 pgs.
Allen, Sean Michael; Applicant-Initiated Interview Summary for U.S. Appl. No. 18/616,301, file Mar. 26, 2024, mailed Dec. 1, 2026, 2 pgs.
Allen, Sean Michael; Non-Final Office Action for U.S. Appl. No. 18/616,301, filed Mar. 26, 2024, mailed Mar. 9, 2026, 19 pgs.
Allen, Sean Michael; Non-Final Office Action for U.S. Appl. No. 18/812,068, filed Aug. 22, 2024, mailed Mar. 10, 2026, 14 pgs.

(56) References Cited

OTHER PUBLICATIONS

Allen, Sean Michael; Final Office Action for U.S. Appl. No. 18/616,301, filed Mar. 26, 2024, mailed Jun. 26, 2026, 14 pgs.
Allen, Sean Michael; Advisory Action for U.S. Appl. No. 18/812,068, filed Aug. 22, 2024, mailed Jun. 22, 2026, 3 pgs.

* cited by examiner

EXPANDING SYSTEMS FOR BREAK CHECK WATER DAMPENING

TECHNICAL FIELD

Field of Use

This disclosure relates to break check valves in a fluid distribution system. More specifically, this disclosure relates to break check valves including elements to reduce water hammer.

Related Art

Fluid containing pipe fittings can be found in varieties of civil infrastructure where they play a critical role in providing fluids. However, many of these structures are particularly vulnerable. Property damage, infrastructure failure, and water loss can occur when a pipe system fitting fails. For example, a pipe system termination fitting such as a hydrant—in particular a wet barrel fire hydrant—that terminates a specific branch of a fluid distribution system can fail if it is impacted by an object or a moving vehicle or otherwise broken free from its usual position in the system. Sudden stoppage of flow in such a system—at the aforementioned pipe fitting or elsewhere—can itself also result in damage to the system.

Many of these fitting are outfitted with devices that are able to regulate or to stop the fluid flow during a dislocation event, wherein a dislocation even can be the separation of a fitting originally connected to the break check valve. Often, break check valves are included for this purpose. While an in-line break check valve configured for use with a hydrant could mitigate such property damage and water loss, such valves can result in water hammer if they close too quickly. Such a valve can be considered a break check valve in that it "checks" movement of the fluid when the pipe system fitting is broken away from the valve but not in the sense that it necessarily prevents backward flow of liquid. Moreover, overly rapid closure of such valves can cause not only water hammer but also a pressure spike resulting in an excessive load on the components of the system sufficient to cause a failure of one or more of those components in varying instances.

SUMMARY

It is to be understood that this summary is not an extensive overview of the disclosure. This summary is exemplary and not restrictive and is intended neither to identify key or critical elements of the disclosure nor to delineate the scope thereof. The sole purpose of this summary is to explain and to exemplify certain concepts of the disclosure as an introduction to the following complete and extensive detailed description.

In one aspect of the current disclose, an expansion device for a break check valve that can be coupled to a pipeline and to a pipe system fitting can include a valve member hingedly connected to the break check valve and configured to rotate from an open position to a closed position only when the pipe system fitting is separated from the break check valve; a bladder that can be coupled to the valve member, the bladder can define a bladder body, the bladder body can define an interior, the interior can be of an adjustable volume in response to fluid pressure; and an inlet that can be configured to provide fluid communication between the pipeline located outside the bladder body and the interior of the bladder body.

In another aspect of the current disclosure, a telescopic valve member for a break check valve can be coupled to a pipe system fitting and can include an outer telescopic valve member; an inner telescopic valve member; and a telescopic valve member that can be positioned between the outer telescopic valve member and the inner telescopic valve member, the telescopic valve member can be slidably coupled to each of the outer telescopic valve member and the inner telescopic valve member.

In another aspect of the current disclosure, a method of using a break check valve that can be coupled to a pipe system fitting can include keeping the break check valve open when the pipe system fitting remains coupled to the break check valve; initiating closure of the break check valve upon decoupling of the pipe system fitting from the break check valve by movement of a valve member; and expanding the shape of the break check valve after closure movement of the valve member of the break check valve.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

DETAILED DESCRIPTION

Figure 1:
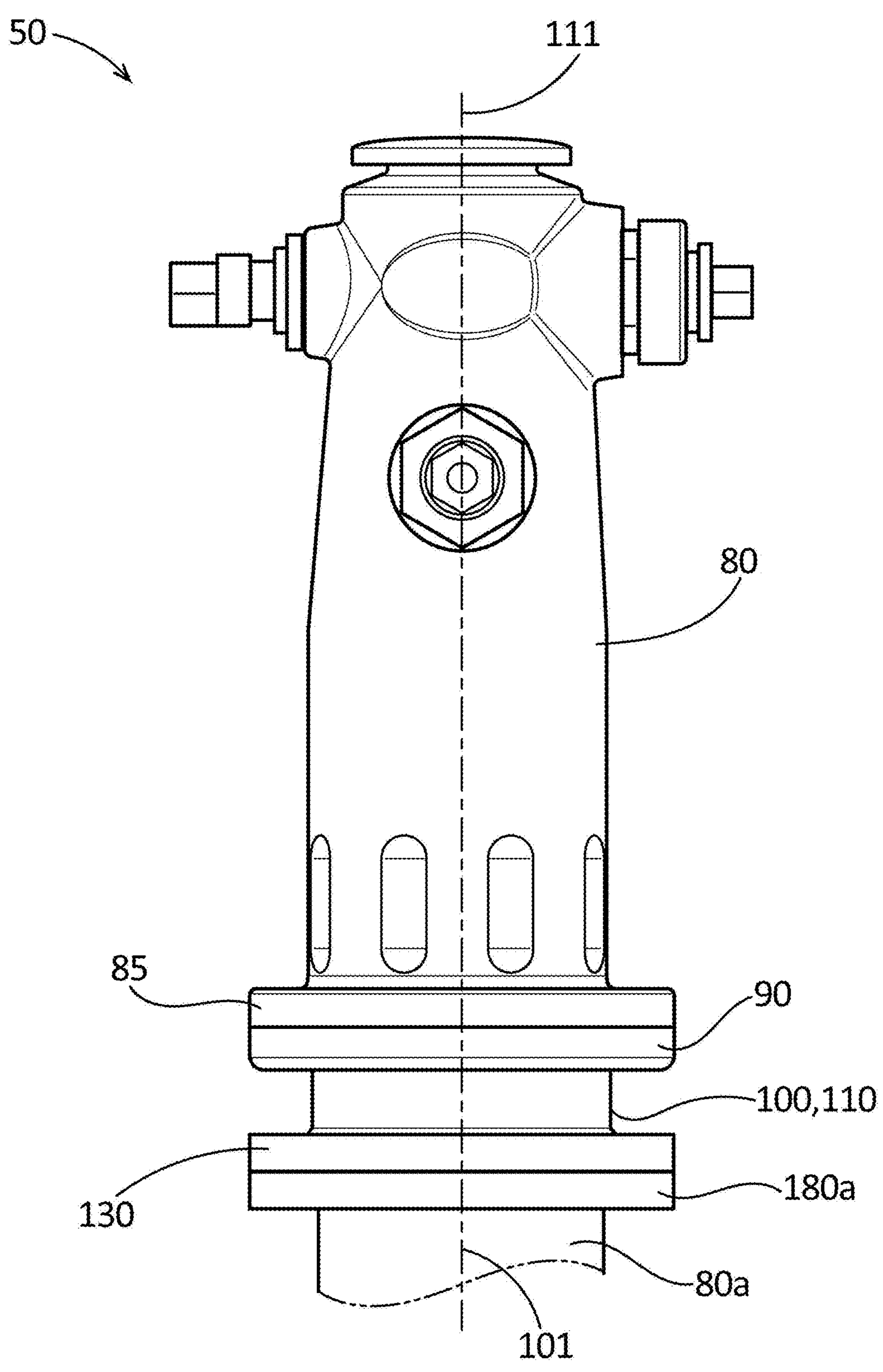
FIG. 1 is a side elevation view of a system comprising a pipe fitting and a break check valve in accordance with one aspect of the current disclosure, the break check valve secured to the pipe fitting via an upper flange, and the break check valve secured to a piping system via a lower flange.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a break check valve nearest to an outlet of the valve, and "rear" is the end of the break check valve which can be opposite or distal the front. "Horizontal" or "horizontal orientation" describes that which is in a plane extending from left to right and aligned with the horizon. "Vertical" or "vertical orientation" describes that which is in a plane which can be angled at 90 degrees to the horizontal.

In various aspects, a break check valve and associated methods, systems, devices, and various apparatuses are disclosed herein. In various aspects, the break check valve or an expansion device thereof can comprise an expansion device. In various aspects, the break check valve or an expansion device thereof can comprise a bladder assembly or telescoping device. In some aspects, the break check valve can be as disclosed in U.S. Pat. No. 11,725,746, issued Aug. 15, 2023, which is hereby incorporated by reference herein in its entirety.

Break check valves such as those typically used with wet barrel hydrants can suffer from excessive water hammer upon activation, which can adversely affect aging infrastructure. Efforts have been made to reduce water hammer and its effects, but the effects remain. Because closing even a dry barrel hydrant too quickly can also cause water hammer, one solution in the industry is simply to close the hydrant very slowly. In some aspects, the break check valve disclosed herein imitates slow closure and thereby can reduce or eliminate the water hammer. In other aspects, the break check valve disclosed herein can reduce water pressure buildup after a closure event.

Turning now to FIG. 1, FIG. 1 provides a side elevation view of a system 50 showing a pipe system fitting or fitting 80, which as shown can be, for example, a wet barrel hydrant, assembled to a break check valve 100. The fitting 80 can define an axis 111, which can be aligned with an axis 101 of the break check valve 100 and can extend through the fitting 80. The fitting 80 can comprise a mounting flange 85 which can be disposed proximal to an end of the fitting 80. The mounting flange 85 can be configured to be received by an upper flange 90 and a lower flange 130. The upper flange 90 and the lower flange 130 can comprise two halves and can connect the fitting 80 to the break check valve 100. The upper flange 90 and the lower flange 130 can be configured to sacrificially fail upon contact with the fitting 80 by another object, e.g., a moving vehicle. The upper flange 90 and the lower flange 130 can comprise semicircular half-rings. The break check valve 100 can comprise a break check valve body or valve body 110. The valve body 110 can comprise a lower flange 130, which can be in communication with a receiving flange 180*a* of a pipeline 80*a* and provide fluid communication therewith. In some aspects, the lower flange 130 can comprise a plurality of through holes 131 (seen with reference to FIG. 3) disposed about the perimeter thereof. In some aspects, the through holes 131 can be sizably configured to receive a fastener, such as a pipe bolt (not shown), which can be configured to releasably secure the lower flange 130 and/or the valve body 110 to the pipeline 80*a*. In an exemplary aspect, the break check valve 100 can be connected to the pipeline 80*a* by way of bolting the lower flange 130 to the receiving flange 180*a* of the pipeline 80*a* via threaded fasteners received by the through holes 131. The pipeline 80*a* can be operable to provide a pressurized source of fluid to the fitting 80. In some aspects, the fitting 80, the break check valve 100, and the pipeline 80*a* can be coaxial about the axes 101,111.

Figure 2:
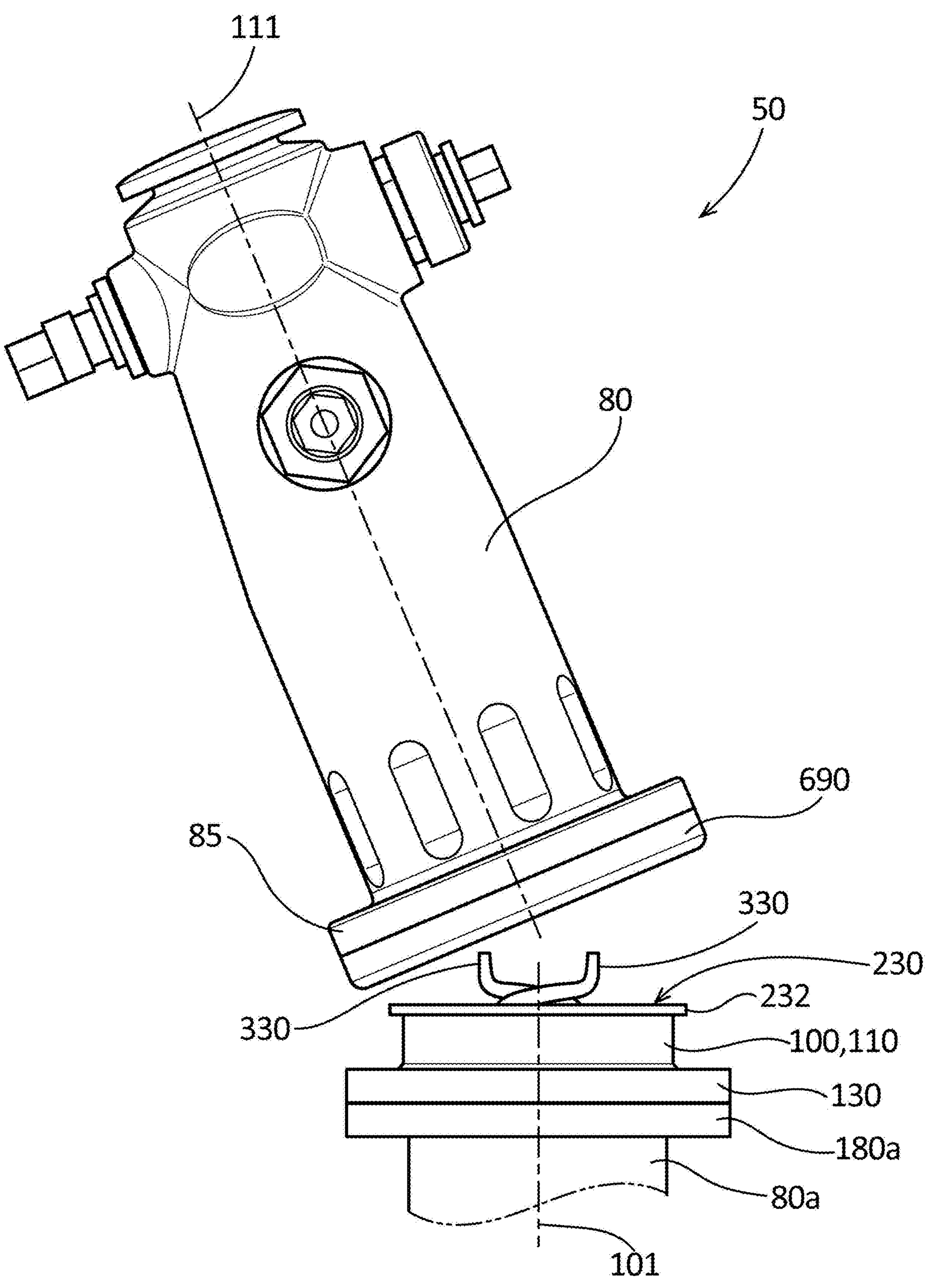
FIG. 2 is a side elevation view of the system of FIG. 1 after dislocation of the hydrant from the break check valve.

FIG. 2 is a side elevation view of the system of FIG. 1 after dislocation of the fitting 80 from the break check valve 100 and subsequent closure of the break check valve 100. Such a dislocation of the fitting 80 can result, for example, during an impact with a vehicle or the like. During dislocation, the break check valve 100 can become activated and the valve member arms 330 can now be visible above or beyond a mating surface 230 of the break check valve 100. In some aspects, as shown, the fitting 80 can be structurally configured to separate at the mating surface 230. In particular, the upper flange 90 and the lower flange 130 can fail and can become disengaged from the top flange 232 during a dislocation event. For the purposes of this filing, the terms "dislocation event", "closure event", "decoupling event", and similar terms can be understood by one of skill in the art to refer to the same or similar types of events-specifically, when a fitting such as fitting 80 can be come decoupled from the system 50. Further, the fitting 80 can be configured so that the lower flange 130 can be substantially resistant to dislocation during a dislocation event.

Figure 3:
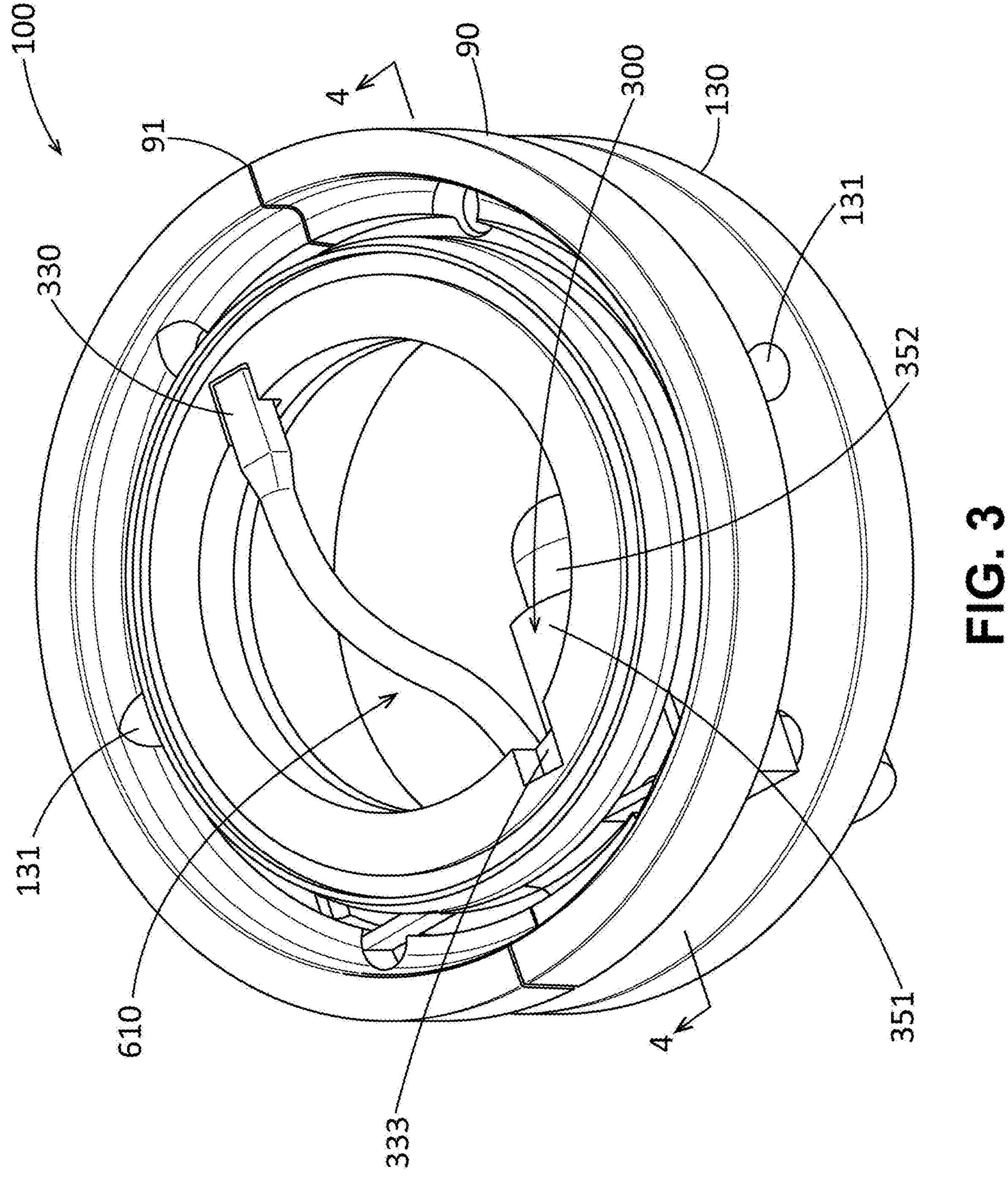
FIG. 3 is a top perspective view of the break check valve of FIG. 1, the break check valve comprising an expansion device and shown in an open position.

Turning now to FIG. 3, a top perspective view of the break check valve 100 in an open position is shown and described. The break check valve 100 can comprise a substantially circular valve body 110. In some aspects, the valve body 110 can comprise an annular cylinder defining a hollow central region which can define an inner cavity 610. In many aspects, the inner cavity 610 can be configured to sustain fluid flow. In one example, the inner cavity 610 can be configured to provide fluid communication between a pipeline 80*a* and a fitting 80 (shown with reference to FIG. 1. In some aspects, the valve body 110 can comprise an upper flange 90 and a lower flange 130, wherein the upper flange 90 can be superjacent to the lower flange 130. One or both of the upper flange 90 and the lower flange 130 can be disposed about a periphery of the valve body 110. In some aspects, the upper flange 90 can be two semicircular flanges that are coupled via an upper flange groove 91 or upper flange grooves 91. In some aspects, the upper flange 90 and/or the lower flange 130 can comprise one or more through holes 131. The through holes 131 can be defined about the periphery of the upper flange 90 or the lower flange 130 and can be configured to receive a fastener. More specifically, the through holes 131 can be configured to receive for example, a bolt which can mechanically couple the break check valve 100 to an external object. In an exemplary aspect, the upper flange 90 of the break check valve 100 can be coupled to the fitting 80 via one or more fasteners received within the through hole 131 and the lower flange 130 of the break check valve 100 can be coupled to the pipeline 80*a* via one or more fasteners received within the through hole 131. In some aspects, a valve member arm 330 can be arranged within the inner cavity 610. The valve member arm 330 can be configured to contact the fitting 80 prior to a dislocation event. The valve member arm 330 can be nested in a recess 333 formed in the periphery of the upper flange 90. In some aspects, a portion of the valve member arm 330 can be configured to remain nested in the recess 333 of the upper flange 90 prior to a dislocation event. For example only, the fitting 80 can be configured to retain a portion of the valve member arm 330 in the recess 333 prior to a dislocation event.

In some aspects, the break check valve 100 can comprise an expansion device 300. The expansion device can be disposed within the inner cavity 610 of the break check valve 100. In some aspects, the expansion device 300 can define an open position and a closed position. The expansion device 300 can be substantially perpendicular to the upper flange 90 while in the open position. The expansion device 300 can be substantially parallel to the upper flange 90 while in the closed position. In many aspects, the expansion device 300 can be mechanically coupled to the valve member arm 330. The valve member arm 330 can be configured to retain the expansion device 300 in a position. In an exemplary aspect, the valve member arm 330 can be configured to retain the expansion device 300 in the open position coincident with a portion of the valve member arm 330 being in contact with the fitting 80. In some aspects, the expansion device 300 can comprise a bladder housing 351 and a bladder 352. In some aspects, the bladder 352 can be configured to be received by the bladder housing 351. For example, the bladder 352 can be nested within the bladder housing 351. In some aspects, the bladder housing 351 can be mechanically coupled to the valve member arm 330. For example, the valve member arm 330 can extend from a portion of the bladder housing 351. More generally, the valve member arm 330 can extend from the expansion device 300.

Figure 4:
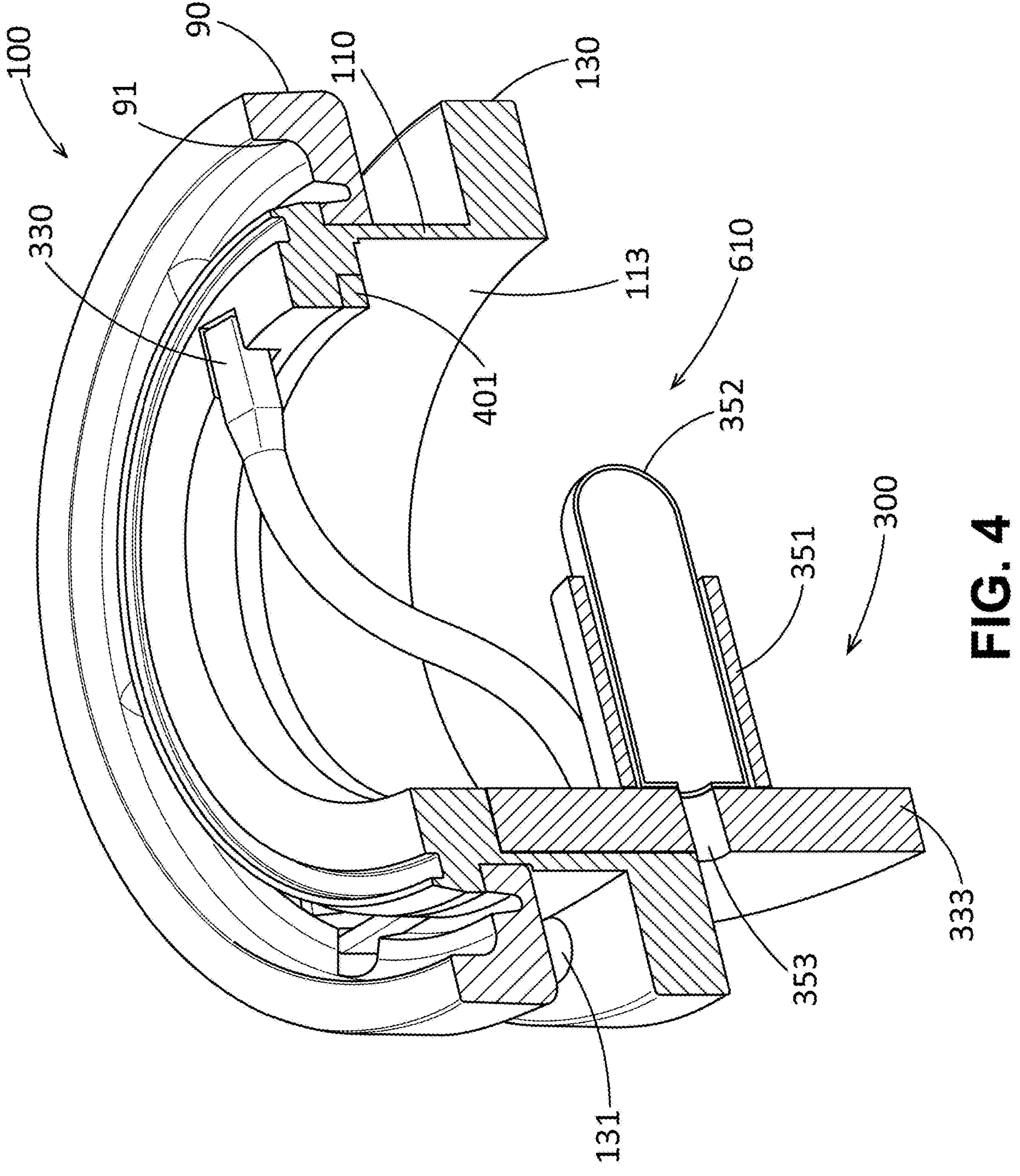
FIG. 4 is a top perspective sectional view of the break check valve of FIG. 3 taken along line 4-4.

The bladder 352 can comprise a structure with variable volume. For example, the bladder 352 can define a first volume and a second volume, wherein the first volume is less than the second volume. In some aspects, the bladder 352 can define an infinite number of discrete volumes between the first volume and the second volume. In some aspects, the bladder 352 can be substantially impermeable to fluids. In some aspects, the bladder 352 can be structured to withstand a hydraulic pressure. In varying aspects, the bladder 352 can be highly flexible and resilient. The bladder 352 can be similar in function to a balloon wherein the body thereof is deformably flexible and substantially elastic. In some aspects, the bladder 352 can be formed of a substantially elastomeric material. For example and without limitation, the bladder 352 can be formed of: polymeric material, natural rubber (NR), synthetic rubber (SBR, NBR, EPDM), polyurethane (PU), silicone rubber, thermoplastic elastomers (TPE), Hypalon, chlorosulfonated polyethylene (CSPE), butyl rubber, or any other suitable elastomeric material known to one of skill in the art. In some aspects, the bladder 352 can be configured to be substantially tear resistant and/or substantially chemical-resistant. The bladder 352 can be configured with a variable volume Turning now to FIG. 4, the break check valve 100 can comprise the upper flange 90 and lower flange 130 disposed about an outer perimeter of the body 110 of the break check valve 100. The upper flange 90 can comprise one or more upper flange grooves 91. The upper flange grooves 91 can be configured to provide a mating seal between the fitting 80 (shown in FIG. 1) and the upper flange 90. In some aspects, the upper flange grooves 91 can be depressions formed about the perimeter of the upper flange 90 and configured to be coupled with a protrusion of the fitting 80. In some aspects, the break check valve 100 can comprise an expansion device 300. The expansion device 300 can be disposed on an interior surface 113 of the check valve body 110. In some aspects, the expansion device 300 can define a valve member 354. The valve member 354 can be substantially circular and can define a diameter that is substantially equivalent a diameter of the inner cavity 610. The valve member 354 can be substantially rigid and can be configured to limit a fluid flow through the break check valve 100. In some aspects, the valve member 354 can be formed of a metallic material or polymeric material. The expansion device 300 can further comprise the bladder housing 351 and the bladder 352. In an exemplary aspect, the bladder 352 can be nested or partially nested within the bladder housing 351, and the bladder housing can be coupled to the valve member 354. Further, the bladder 352 and bladder housing 351 can be disposed at a substantially central location of the valve member 354.

In some aspects, the expansion device can comprise a fluid passage 353. The fluid passage 353 can be a port which can extend through the valve member 354. The fluid passage 353 can be configured to provide fluid communication between a fluid source, such as the pipeline 80*a*, and the bladder 352. In some aspects, the fluid passage 353 can be configured to provide fluid communication to the bladder 352 when the expansion device 300 is in a closed position. In some aspects, the fluid passage 353 can limit fluid flow. The break check valve 100 can comprise a seal 401, which can be positioned between the valve body 110 and the expansion device 300 in the closed positions of the expansion device 300. The seal 401, which can be a shim or spacer, and can be positioned along or aligned with the axis 101 of the break check valve 100 below a flange of the valve body 110, such as the upper flange 90. The seal 401 can define a first or upper surface and a second or lower surface opposite from the upper surface. The seal 401 can define an outer diameter, an inner diameter, and a thickness in an axial direction with respect to the axis 101. The inner diameter of the seal 401 can be substantially equal to at least an inner diameter of the check valve body 110 proximate to or at the upper flange 90, and the outer diameter of the seal 401 can be less than or equal to an inner diameter of the check valve body 110 adjacent to the upper flange 90. The seal 401 can be formed from an elastomeric material such as, for example and without limitation, rubber (e.g., a natural rubber or a synthetic rubber such as VITON™ rubber), neoprene, or ethylene propylene diene.

Figure 5:
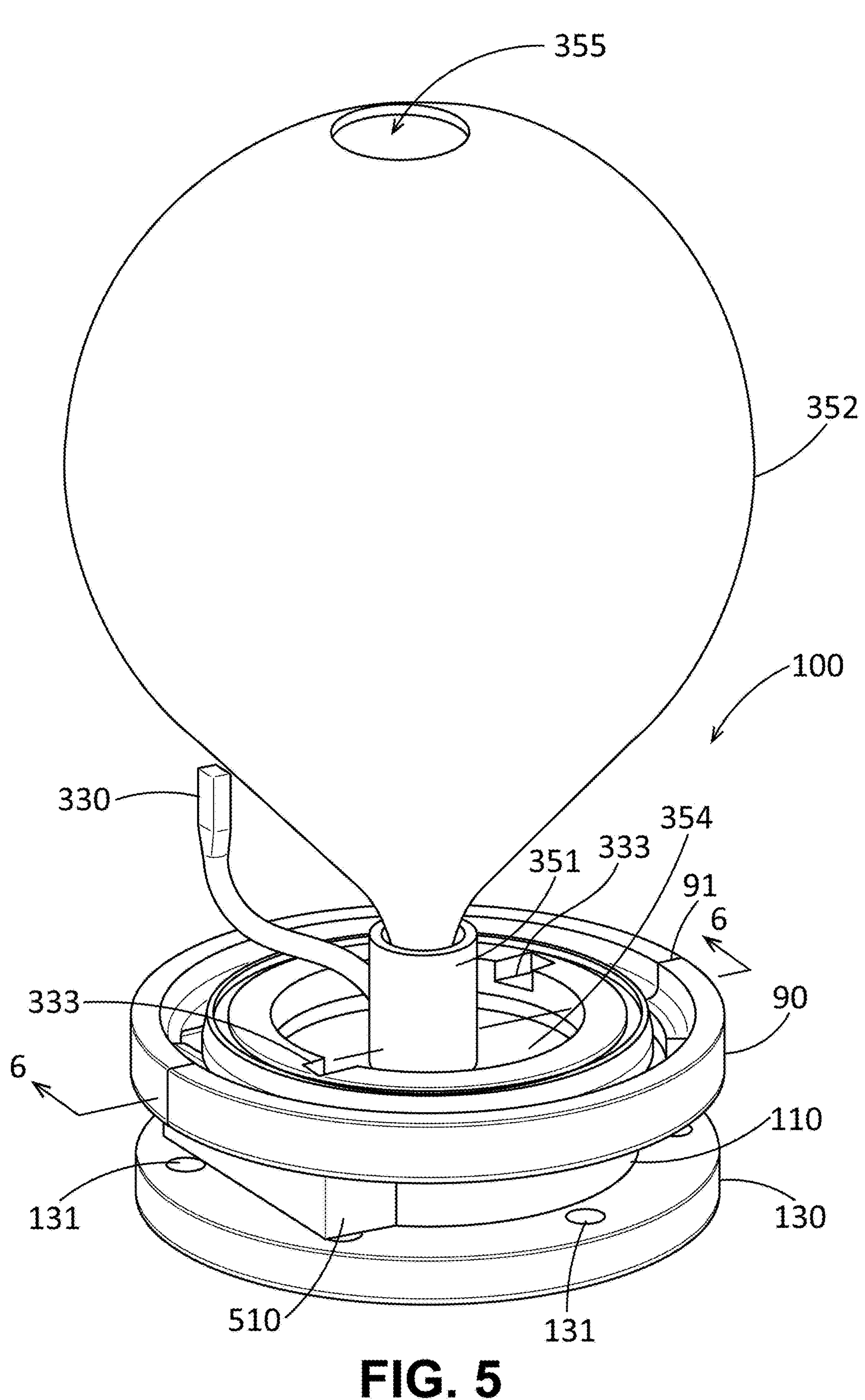
FIG. 5 is a perspective view of the break check valve, the expansion device, and the upper and lower flange of FIG. 3 with the break check valve shown in a closed position.

Turning now to FIG. 5, in some aspects, the valve member arm 330 can be configured to retain the expansion device 300 in the open position while the pipe fitting 80 is connected to the break check valve 100. After a dislocation event and the fitting 80 becomes separated from the break check valve 100, the valve member arm 330 can release the expansion device 300 and allow the expansion device 300 to assume the closed position. The expansion device 300 can be configured to engage with the interior surface 113 (shown in FIG. 4) of the valve body 110. In varying aspects, after a dislocation event and when the expansion device 300 is in the closed position, the valve member 354 can be configured to reduce the flow of fluid through the break check valve 100 substantially. In some aspects, when the expansion device 300 is in the closed position, fluid can flow through the fluid passage 353 and enter the bladder 352. For illustrative example only, and without limitation, when the expansion device 300 is in the closed position, it can be configured to discontinue fluid flow past the break check valve 100 in various aspects and to establish fluid flow through the fluid passage 353 and to the bladder 352.

The bladder 352 can define a bladder interior which can be sealed and configured to contain the fluid therein. In some aspects, the bladder 352 can be configured to receive the fluid provided by the fluid passage 353. The bladder 352 can be configured to expand when the fluid enters the bladder interior. During expansion, the bladder 352 can become erect and occupy a position superjacent to the break check valve 100. For example, after a dislocation event, the expansion device 300 can modulate into the closed position and provide fluid communication via the fluid passage 353 to the bladder 352. The establishment of fluid communication can urge the bladder 352 to expand and occupy a vertical position equal to or above the upper flange 90. The bladder 352 can be configured to indicate to a user that a closing event has occurred. For example, through expansion and ascension after a closure event, the bladder 352 can assume a position that is visible by an onlooker. The bladder 352 can be configured with material, coatings, or indicia which can alert bystanders to the closure event. In some aspects, the bladder 352 can define a substantially spherical structure defining a curvilinear surface when erect. Prior to the dislocation event, the bladder 352 can be housed or partially housed within the bladder housing 351. The bladder housing 351 can be a structure that can be arranged on the expansion device 300. In an exemplary aspect, the bladder housing 351 can be arranged in line with the fluid passage 353. In some aspects, the bladder housing 351 can define the shape of a bladder.

In several aspects, the bladder housing 351 can be a structure which defines a hollow interior. In such aspects, the hollow interior of the bladder housing 351 can be configured to store the bladder 352. For example, the hollow interior of the bladder housing 351 can store the bladder 352 prior to the closure of the expansion device 300. The bladder 352 can be nested or partially nested within the hollow interior of the bladder housing 351 prior to a closure event. In some aspects, the bladder housing 351 can be configured to locate the bladder 352 after the closure of the expansion device 300. For example, the bladder housing 351 can be configured to store and/or to support the bladder 352 or a portion of the bladder 352 after the closure of the expansion device. In certain aspects, the bladder housing 351 can be configured to guide the expansion of the bladder 352 during an expansion event. The bladder housing 351 can be configured to support the bladder 352 or a portion thereof during expansion. The bladder housing 351 can be configured to limit the amount of expansion of the bladder 352 during expansion. In some aspects, the expansion device 300 can be connected to the break check valve 100. For example, the expansion device 300 can be hingedly connected to the interior surface 113 of the break check valve 100. The break check valve 100 can comprise a swingblock 510 on a portion of the break check valve 100. The swingblock 510 can define a hinged connection between the break check valve 100 and the expansion device 300.

Figure 6:
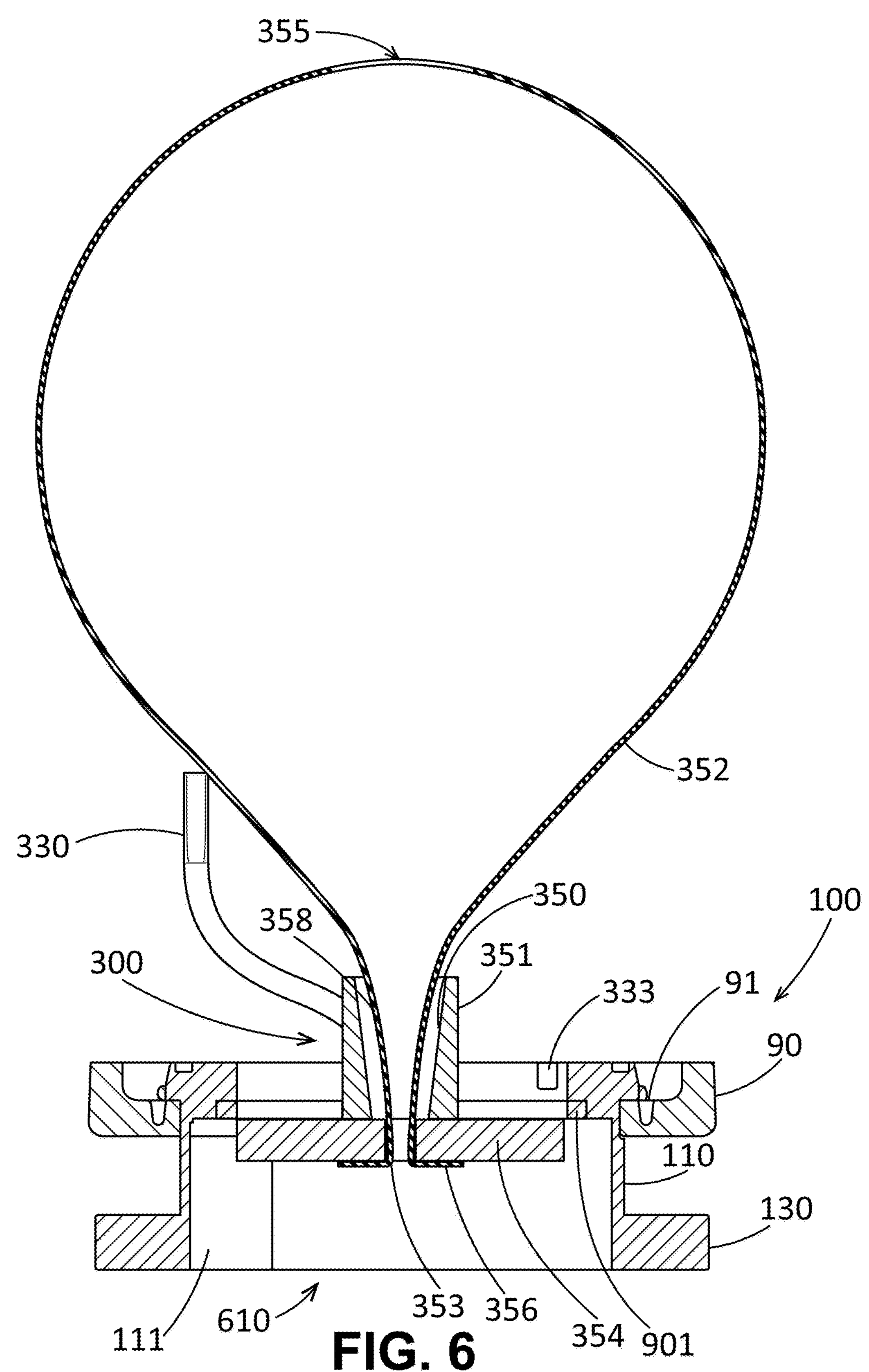
FIG. 6 is a sectional side view of the break check valve, expansion device, and the upper and lower flange of FIG. 5 taken along line 4-4 of FIG. 3 and with the break check valve shown in the closed position.

Turning now to FIG. 6, after a dislocation event, the bladder 352 of the break check valve 100 can be configured to expand and to ascend vertically above the break check valve 100. The bladder 352 can comprise a an opening 355, which can be a pinhole, disposed on its surface. The opening 355 can define an opening configured to provide fluid flow. In some aspects, the opening 355 can be configured to provide pressure relief, for example fluid pressure. In some aspects, the opening 355 can be disposed on a surface of the bladder 352. In an exemplary aspect, the opening 355 can be configured to discharge fluid that can accumulate in the bladder 352. In a further aspect, the opening 355 can be configured to discharge fluid from the bladder 352 in a visible stream about the break check valve 100. The bladder 352 can be nested in the bladder housing 351. In some aspects, a lower portion 358 of the bladder 352 can be nested in the bladder housing 351 after a dislocation event. In some aspects, the lower portion 358 of the bladder 352 can be nested within the bladder housing 351. In an exemplary aspect, the lower portion 358 of the bladder 352 can define a taper, wherein the taper of the lower portion 358 of the bladder 352 increases in diameter approaching the bladder 352.

In some aspects, the bladder housing 351 can comprise a tapered sidewall. The tapered sidewall can comprise a canted surface which defines an increasing diameter extending vertically. In some aspects, the tapered sidewall of the bladder housing 351 can define a void similar to an inverted cone or triangle. In an exemplary aspect, the taper of the lower portion 358 of the bladder 352 can be substantially mated with the tapered sidewall of the bladder housing 351. Further, the taper of the lower portion 358 of the bladder 352 can be configured to nest within the tapered sidewall of the bladder housing 351. A lowermost portion of the bladder 352 can comprise a bladder flange 356. The bladder flange 356 can comprise a flat portion which can be arranged perpendicular to the bladder 352. In some aspects, the bladder flange 356 can be coplanar with the valve member 354. The bladder flange 356 can be configured to engage with a portion of the valve member 354. The bladder flange 356 can be configured to retain the bladder 352 against the valve member 354. The bladder flange 356 can be substantially rigid and can be configured to resist elastic deformation.

Figure 7:
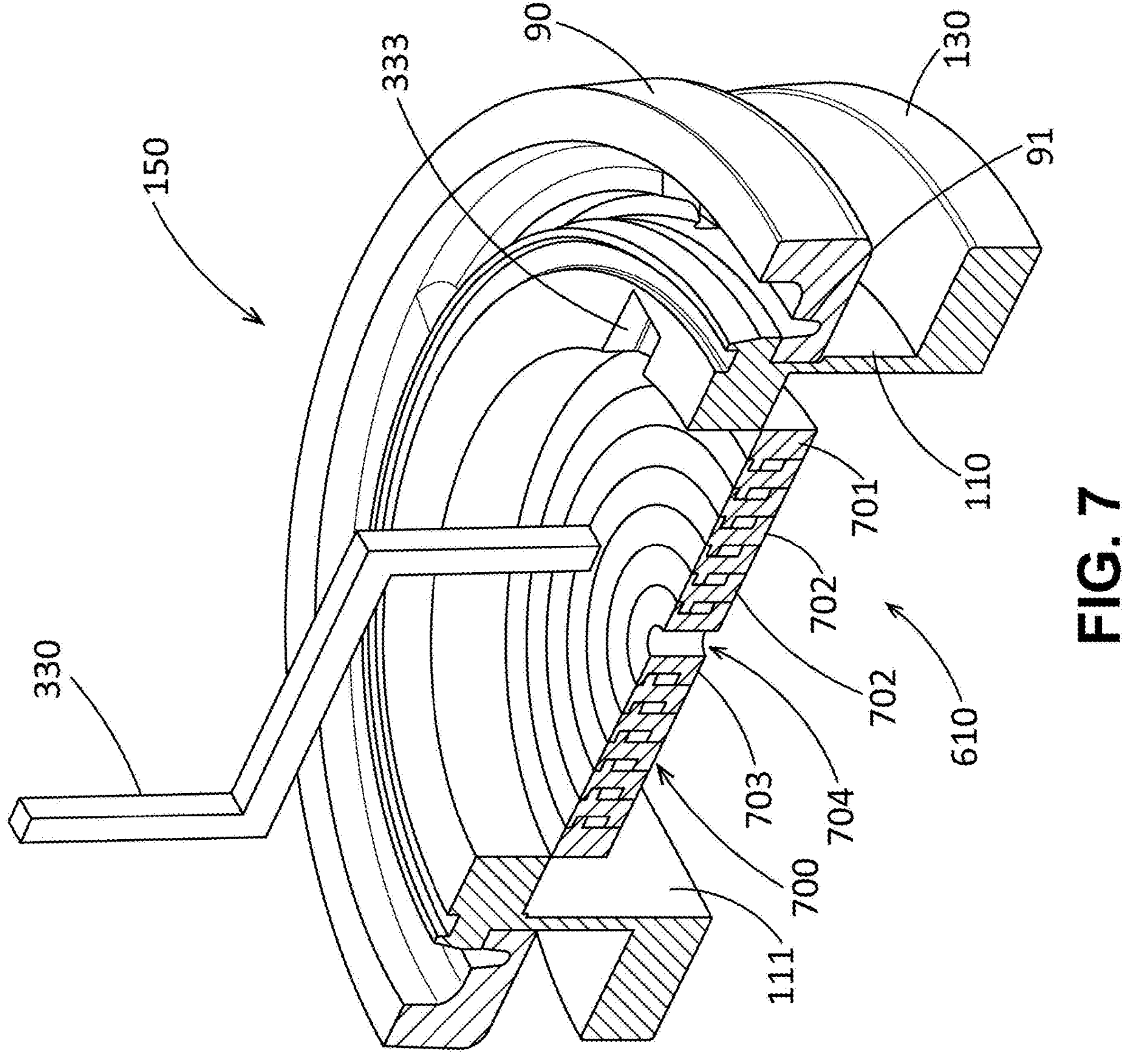
FIG. 7 is a top perspective sectional view of another aspect of a break check valve and an expansion device, taken along line 4-4 of FIG. 3 and shown in the closed position.

Turning now to FIG. 7, an alternative aspect of the break check valve 100 can comprise the break check valve body 110 which can define the upper flange 90 and the lower flange 130. The upper flange can comprise the upper flange grooves 91. In some aspects, the break check valve 100 can comprise a hollow structure which can define the interior surface 113 and inner cavity 610. The break check valve 100 can comprise a telescopic valve member 700. The telescopic valve member 700 can comprise a substantially circular member which can be similarly dimensioned to the inner cavity 610. In an exemplary aspect, the telescopic valve member 700 can be hingedly connected to the interior surface 113 of the break check valve 100. The telescopic valve member 700 can be operable to pivot about the hinge and to define a range of open and closed positions, wherein the open position can define the telescopic valve member 700 being substantially parallel to the interior surface 113 and the closed position can define the telescopic valve member 700 being substantially perpendicular to the interior surface 113. More generally, while in the closed position, the telescopic valve member 700 can be configured to discontinue substantial fluid flow through the inner cavity 610 of the break check valve 100. In some aspects, the telescopic valve member 700 can define the valve member arm 330. The valve member arm 330 can comprise a rigid and elongated member that can be linear or curvilinear. In some aspects, the valve member arm 330 can comprise one or more angled sections. The valve member arm 330 can be configured to retain the telescopic valve member 700 in a position. For example, the valve member arm 330 can engage with a surface of the telescopic valve member 700 and be configured to retain the telescopic valve member 700 in the open position.

In some aspects, the telescopic valve member 700 can comprise a perimeter ring 701. The perimeter ring 701 can be a substantially circular rigid member that can be sizeably configured to engage with the interior surface 113 of the break check valve 100. The perimeter ring 701 can be configured to engage mechanically with the interior surface 113 of the break check valve 100, for example via a hinged connection. In some aspects, the perimeter ring 701 can be an annular ring which can define an outer diameter and an inner diameter. The outer diameter of the perimeter ring 701 can be substantially equal to the diameter of the interior surface 113. The telescopic valve member 700 can further define a mid ring 702. The mid ring 702 can be mechanically coupled to the perimeter ring 701. In some aspects, mid ring 702 can be dimensioned to be nested against the perimeter ring 701. The mid ring 702 can comprise an annular ring defining an outer diameter and an inner diameter. For example only, and without limitation, the mid ring 702 can comprise an outer diameter which can be substantially equal to the inner diameter of the perimeter ring 701. In such an example, the mid ring 702 can be mechanically engaged with the perimeter ring 701 in a nested configuration. In some aspects, the telescopic valve member 700 can comprise a plurality of mid rings 702, each dimensioned to be nested axially with an adjacent another mid ring 702. In an exemplary aspect, the telescopic valve member 700 can comprise a series of mid rings 702 which can be in axial mechanical communication. The telescopic valve member 700 can further comprise an inner ring 703. The inner ring 703 can be a substantially circular annular ring. The inner ring 703 can be configured to be nested against the inner diameter of the mid ring 702. In aspects containing multiple mid rings 702, the inner ring can be configured to be nested against the inner diameter of the nearest adjacent mid ring 702. The inner ring 703 can define an outer diameter and an inner diameter wherein the outer diameter of the inner ring 703 is dimensioned substantially equally to the inner diameter of the nearest mid ring 702. The inner ring 703 can define a hollow center which can be configured to establish fluid flow. More generally, the inner ring 703 can comprise a hollow fluid passage or fluid bypass 704.

The telescopic valve member 700 can comprise the perimeter ring 701, one or more sequential mid rings 702, and the inner ring 703 disposed consecutively about a linear axis. In such an arrangement, the telescopic valve member 700 can form a disc. In some aspects, the mid ring 702 can be configured to translate vertically with respect to the perimeter ring 701. In varying aspects, the inner ring 703 can be configured to translate vertically with respect to the mid ring 702. In varying aspects, the series of mid rings 702 can each translate vertically with respect to their adjacent mid ring 702. In varying aspects, the combined translation of the inner ring 703 and the mid ring 702 can define a telescopic valve member 700 expansion. The telescopic valve member 700 can be configured to expand when acted on by fluid pressure (shown with reference to FIG. 10). For example only, and without limitation, when the telescopic valve member 700 is in the closed position, the telescopic valve member 700 can be configured to interact with fluid. The fluid interaction can place fluid pressure on the telescopic valve member 700 to urge the telescopic valve member 700 to expand. The telescopic valve member 700 can be configured to resist the flow of the fluid during the expansion event. In some aspects, the telescopic valve member 700 can comprise a surface defining a variable surface area dependent on the state of translation of the telescopic valve member 700. In some aspects, the fluid bypass 704 of the telescopic valve member 700 can be configured to provide fluid flow while the telescopic valve member 700 can be in contact with the fluid. For example, the fluid bypass 704 can be configured to reduce the buildup of fluid pressure.

Figure 8:
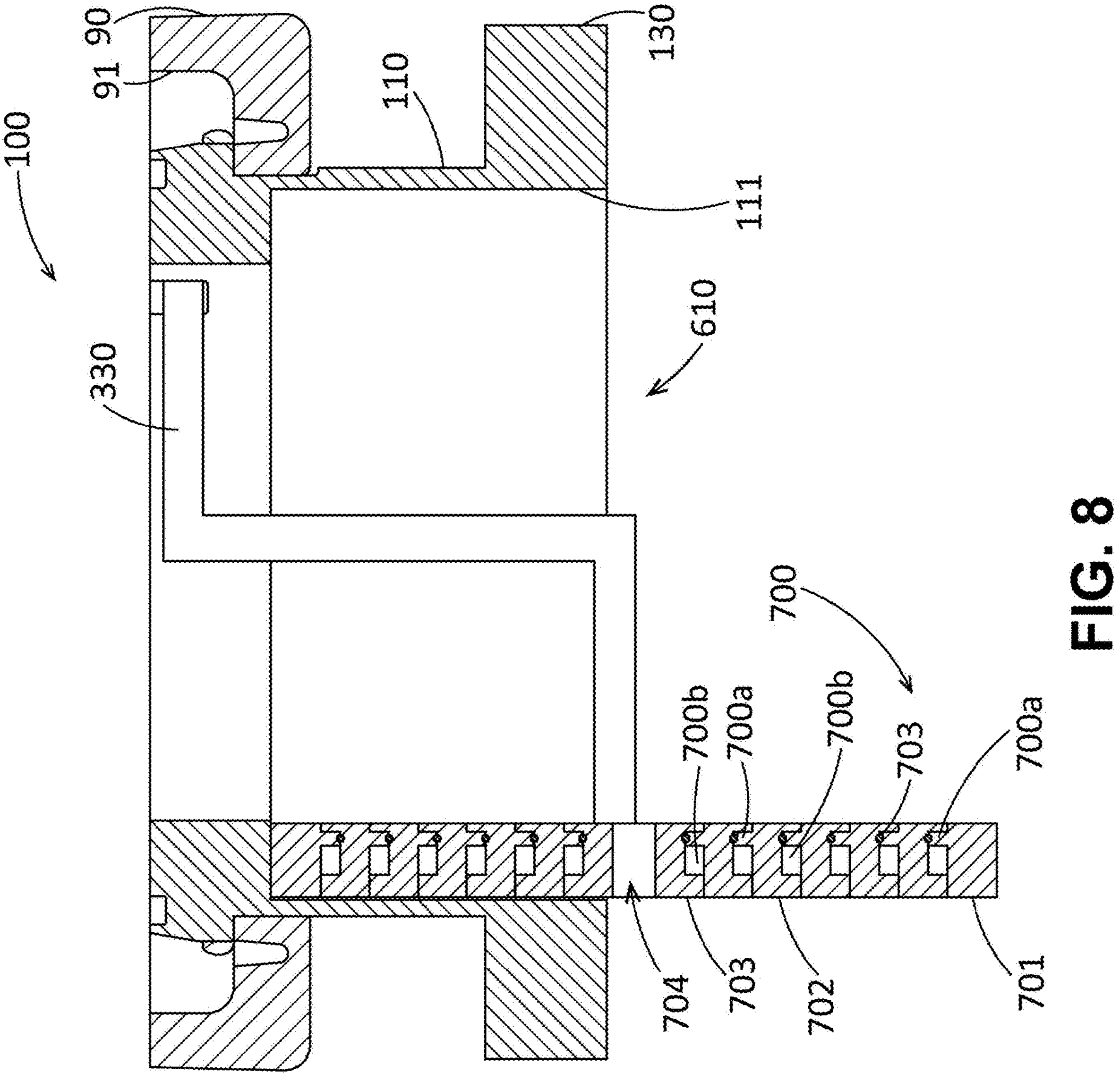
FIG. 8 is a sectional side view of the break check valve and telescopic valve member of FIG. 7 shown in the open position.

Turning now to FIG. 8, a frontal cross sectional view of the break check valve 100 and telescopic valve member 700 of FIG. 7 in the open position is shown and described. The break check valve 100 can comprise the telescopic valve member 700 which can comprise the inner ring 703, mid ring 702, and perimeter ring 701. The inner ring 703, mid ring 702, and perimeter ring 701 can be laterally and sequentially connected. In some aspects, the perimeter ring 701 can comprise a translatable interlock feature. In some aspects, the perimeter ring can comprise tongue 700*a* on a lateral side. The perimeter ring tongue 700*a* can comprise a protrusion extending from the lateral side of the perimeter ring 701. In some aspects, the mid ring 702 can comprise a translatable interlock feature. In some aspects, the mid ring 702 can comprise a tongue 700*a*. In other aspects, the mid ring 702 can comprise a groove 700*b*. The groove 700*b* can define an indent configured to receive the tongue 700*a*. In some aspects, the groove 700*b* can define a travel path for the tongue 700*a*. Further, the tongue 700*a* can be configured to translate within the groove 700*b*.

In an exemplary aspect, the mid ring 702 can define a first lateral side and a second lateral side, wherein the first lateral side is opposite the second lateral side and the first lateral side defines the tongue 700*a* and the second lateral side comprises the groove 700*b*. In some aspects, the inner ring 703 can comprise a translatable interlock feature. In some aspects, the inner ring 703 can comprise a groove 700*b* on a lateral side. For example only, and without limitation, the perimeter ring 701, one or more mid rings 702, and the inner ring 703 can be mechanically coupled via a series of alternating tongue 700*a* and groove 700*b* features disposed on adjacent lateral sides of the perimeter ring 701, one or more mid rings 702, and the inner ring 703. The telescopic valve member 700 can be configured to telescope via the combination of the tongues 700*a* and grooves 700*b* between the perimeter ring 701, mid ring 702, and the inner ring 703. In some aspects, the tongue 700*a* can comprise a seal 705. The seal 705 can be defined at an edge of the tongue 700*a*. In some aspects, the seal 705 can be defined between the tongue 700*a* and the groove 700*b*. For example only, the seal 705 can be configured to provide a substantially fluid resistant barrier between the tongue 700*a* and the groove 700*b*. The seal 705 can be formed from an elastomeric material such as, for example and without limitation, rubber (e.g., a natural rubber or a synthetic rubber such as VITON™ rubber), neoprene, or ethylene propylene diene.

With returning reference to FIG. 3, the valve member arm 330 can be retained by the fitting 80 while the fitting 80 is coupled to the system 50 (seen with reference to FIGS. 1-2). In some aspects, the valve member arm 330 can be configured to retain the telescoping valve member 700 in an open position prior to a dislocation event. In some aspects, the valve member arm 330 can be configured to provide a holding force to the telescoping valve member 700. After the dislocation event, the valve member arm 330 can be configured to release the holding force.

Figure 9:
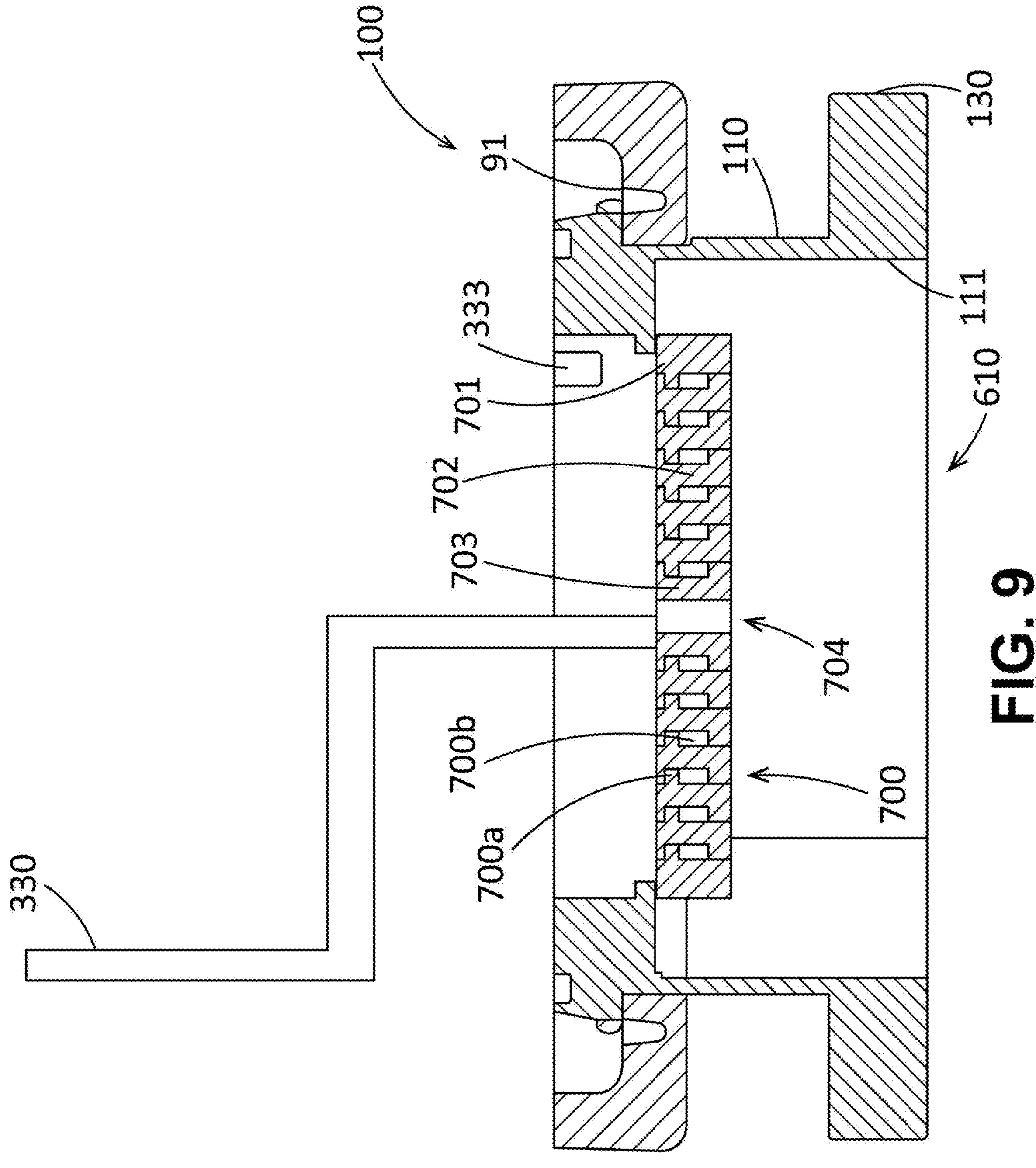
FIG. 9 is a sectional side view of the break check valve and telescopic valve member of FIG. 7 shown in the closed position.

Turning now to FIG. 9, in varying aspects, the inner cavity 610 of the break check valve 100 can be filled with fluid. After a dislocation event, the fluid can urge the telescopic valve member 700 from the open position to the closed position. When the telescopic valve member 700 moves to the closed position, the break check valve 100 can be substantially sealed. In some cases, the telescopic valve member 700 can be configured to reduce the fluid that flows through the break check valve 100. In some aspects, the fluid bypass 704 can be configured to provide fluid pressure relief when the telescopic valve member 700 is in the closed position.

Figure 10:
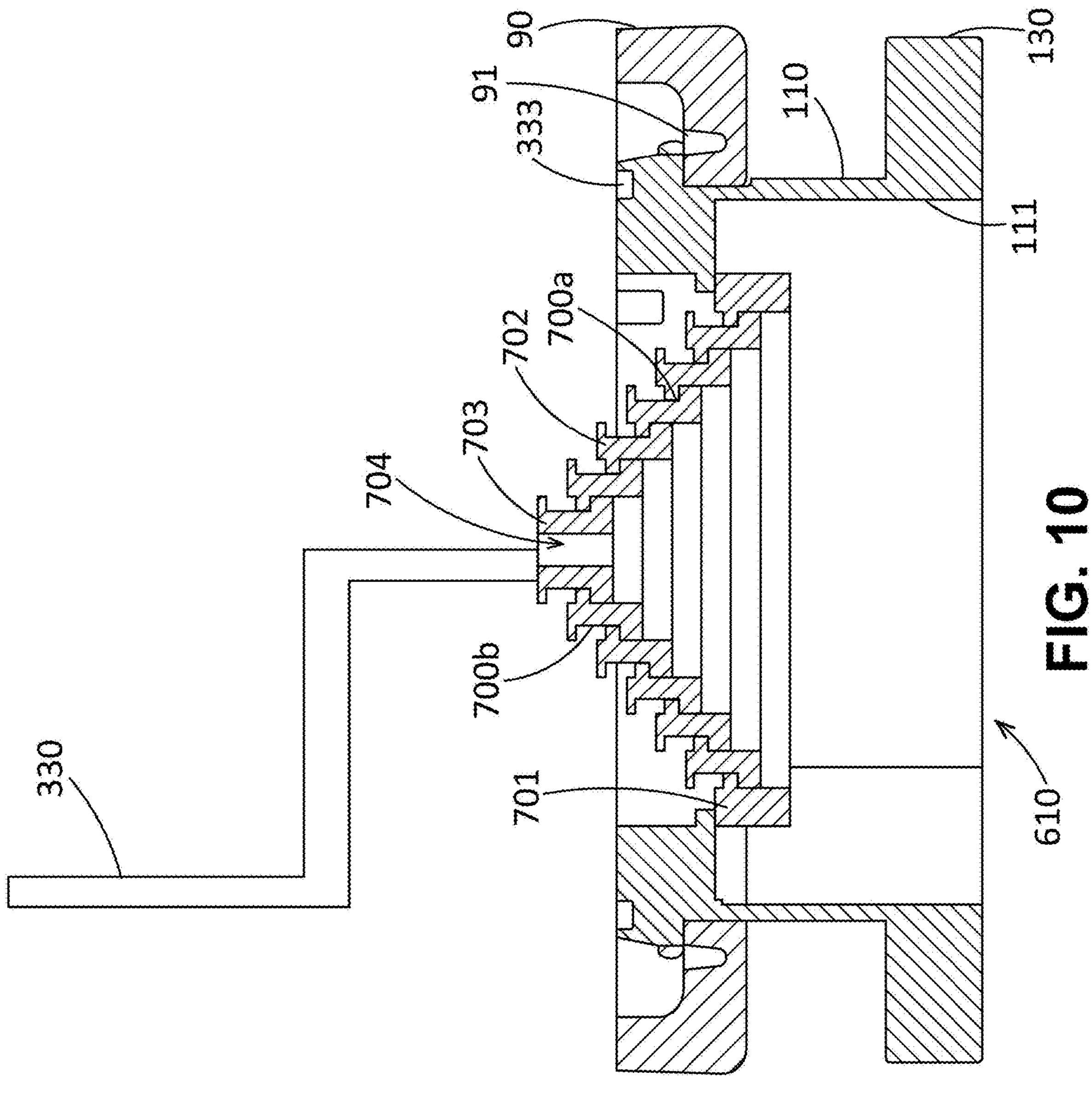
FIG. 10 is a sectional side view of the break check valve and telescopic valve member of FIG. 7 shown in the closed position and expanded.

Turning now to FIG. 10, the perimeter ring 701 and/or the mid ring 702 can define a lateral side comprising the tongue 700*a* which can be received by the groove 700*b* defined on a lateral side of the adjacent mid ring 702 and/or inner ring 703. In some aspects, the groove 700*b* can define a travel path. In some aspects, the tongue 700*a* can be configured to translate about the travel path of the groove 700*b*. For example only, the telescopic valve member 700 can comprise a plurality of tongues 700*a* mechanically coupled to a plurality of adjacent grooves 700*b* each defining a travel path wherein each tongue 700*a* can be translatable therein one groove 700*b*. In an exemplary aspect, the telescopic valve member 700 can define a uniform translation defined by the translation of one or more tongues 700*a* within their adjacent grooves 700*b*. In some aspects, the telescopic valve member 700 can be adapted for a uniform translation when in the closed position. In some aspects, the uniform translation of the telescopic valve member 700 can increase the surface area of the telescopic valve member 700. The telescopic valve member 700 can be configured to provide a resistance to the uniform translation. In an exemplary aspect, after a dislocation event, the fluid contained within the break check valve 100 can urge the telescopic valve member 700 to undergo a uniform translation. The telescopic valve member 700 can be configured to resist the uniform translation when urged by the fluid. In some aspects, the telescopic valve member 700 can be configured to provide a normal reactive force when acted upon by an external force, such as a force provided by water pressure.

Figure 11:
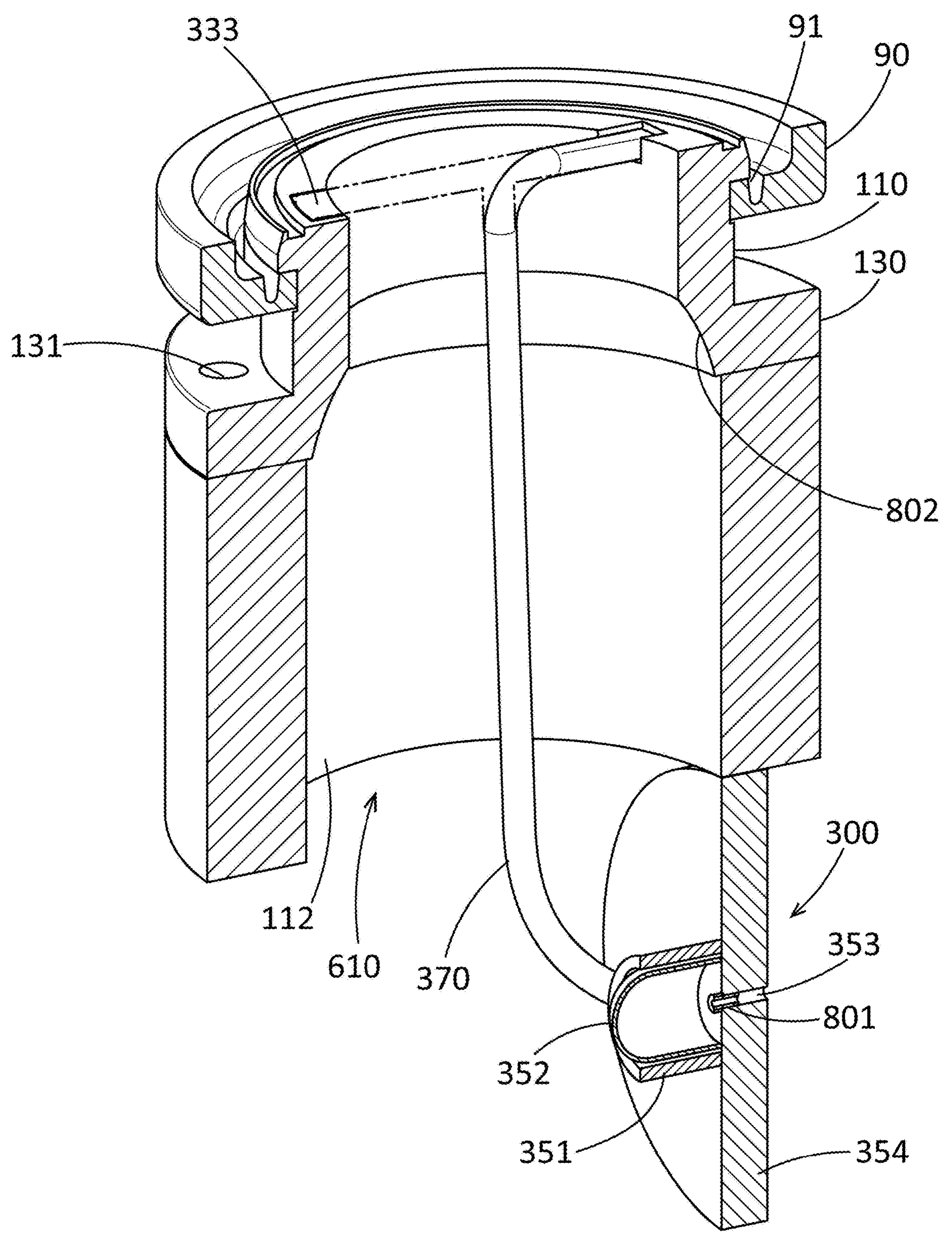
FIG. 11 is a perspective sectional view of the break check valve and expansion device in accordance with another aspect of the current disclosure and shown in an open position.

Turning now to FIG. 11 check valve 100 can comprise the upper flange 90, break check valve body 110, and lower flange 130. The break check valve 100 can comprise a chamber 800 connected to a portion of the break check valve 100. In some aspects, the break check valve 100 can comprise the chamber 800 coupled to the lower flange 130 of the break check valve 100. The chamber 800 can define a circular or annular cross section and can define a hollow interior. The chamber 800 can extend subjacent to the break check valve 100. In some aspects, the chamber 800 can be configured to extend the inner cavity 610. In some aspects, the chamber can be fluidly coupled to a fluid source, such as the pipeline 80*a* (seen with reference to FIG. 1). The chamber 800 can be coupled to the break check valve 100. The chamber 800 can define a hollow interior and can define a chamber interior wall 112. In some aspects, the break check valve 100 can comprise a sealing surface 802. The sealing surface 802 can be disposed about an interior portion of the break check valve 100, such as the interior surface 113 of the break check valve 100.

In some aspects, the break check valve 100 can comprise the expansion device 300. The expansion device 300 can comprise the bladder housing 351, the bladder 352, the fluid passage 353, and the valve member 354. In some aspects, the expansion device 300 can be mechanically coupled to the chamber 800. In an exemplary aspect, the expansion device 300 can be hingedly coupled to a lower portion of the chamber 800. Further, the expansion device 300 can be hingedly coupled to a lowermost portion of the chamber 800. In some aspects, the chamber 800 can define a chamber diameter and the expansion device 300 can define an expansion device diameter. In some aspects, the expansion device diameter can be substantially equal to the chamber diameter. In some aspects, the expansion device 300 can be configured to reduce substantially the area of the chamber 800. In some aspects, the expansion device 300 can be configured to reduce the flow of fluid through the chamber 800. The expansion device 300 can comprise a nozzle 801. The nozzle 801 can be secured to the expansion device 300, for example in the fluid passage 353. The nozzle 801 can be threadedly secured within the fluid passage 353. In some aspects, the nozzle 801 can be configured to modify fluid flow. For example only, the nozzle 801 can be configured to throttle the fluid flow through the fluid passage 353. In some aspects, the nozzle 801 can be configured to modulate the fluid flow through the fluid passage 353. In various aspects, the expansion device 300 can comprise an elongated valve member arm 370.

Figure 12:
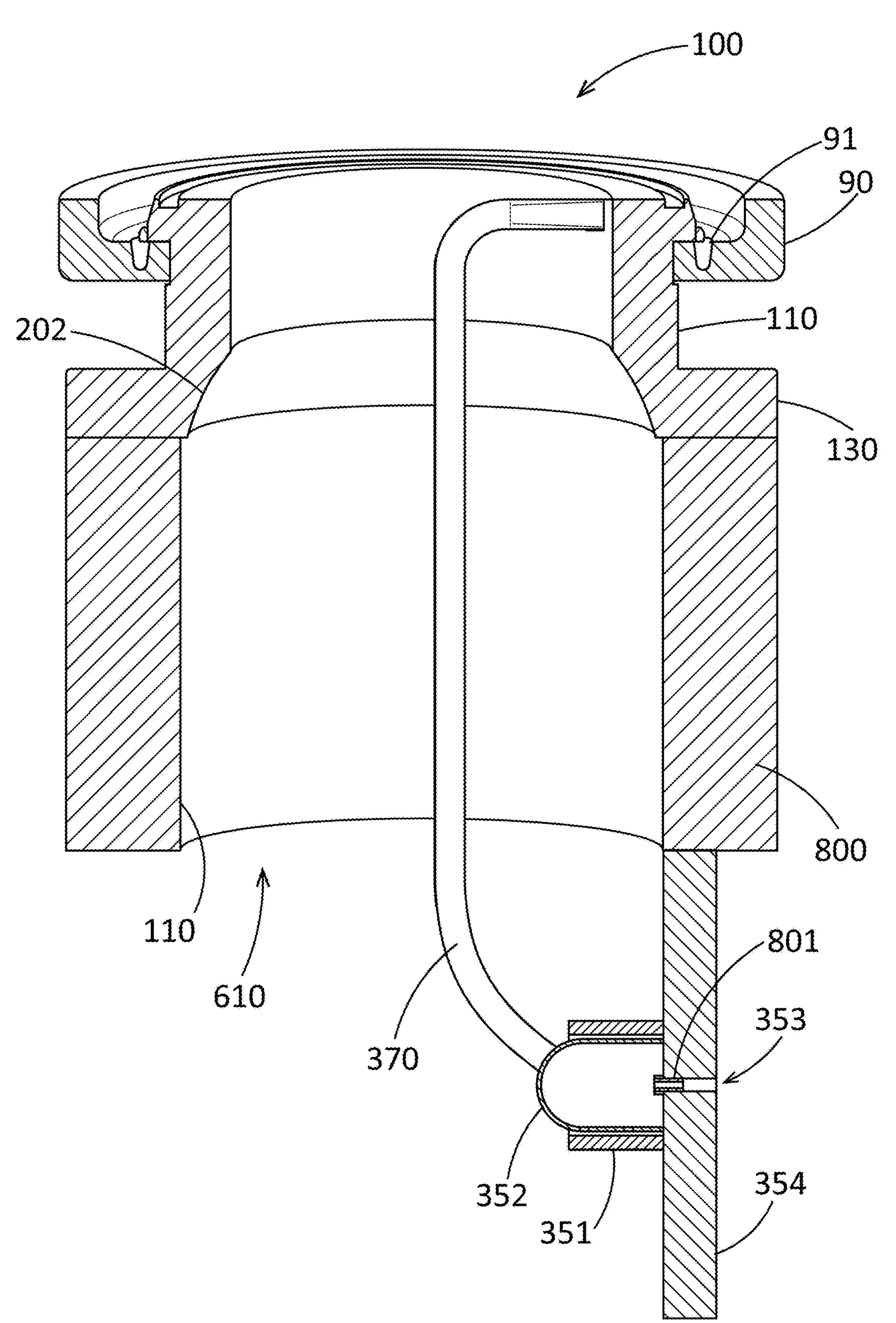
FIG. 12 is a front sectional perspective view of the break check valve and expansion device of FIG. 11 with the break check valve shown in an open position.

Turning now to FIG. 12, the expansion device 300 can define an open position, wherein the expansion device 300 in the open position can be substantially parallel with the chamber 800. The expansion device 300 can also define a closed position, wherein the expansion device 300 can be substantially perpendicular with the chamber 800. Again, in various aspects, the expansion device 300 can comprise the elongated valve member arm 370. The elongated valve member arm 370 can be disposed on a surface of the expansion device 300, such as on the valve member 354. In some aspects, the elongated valve member arm 370 can be configured to retain the expansion device 300. For example, the elongated valve member arm 370 can be configured to retain the expansion device 300 in an open position. The elongated valve member arm 370 can be configured to engage with the fitting 80. In an exemplary aspect, the fitting 80, prior to a dislocation event, can mechanically engage with the elongated valve member arm 370. The elongated valve member arm 370 can mechanically engage with the expansion device 300. In such an exemplary aspect, the elongated valve member arm 370 can retain the expansion device 300 in the open position prior to a dislocation event. In some aspects, the elongated valve member arm 335 can be structured to extend the length of the break check valve 100, and/or the chamber 800. In some aspects, the sealing surface 802 can be a portion of the interior of the break check valve 100, the chamber 800, or both. The sealing surface 802 can be a portion of one or both of the interior surface 113 and/or the chamber interior wall 112. The sealing surface 802 can define a curvilinear surface. The sealing surface 802 can be canted relative to the interior surface 113 or the chamber interior wall 112.

Figure 13:
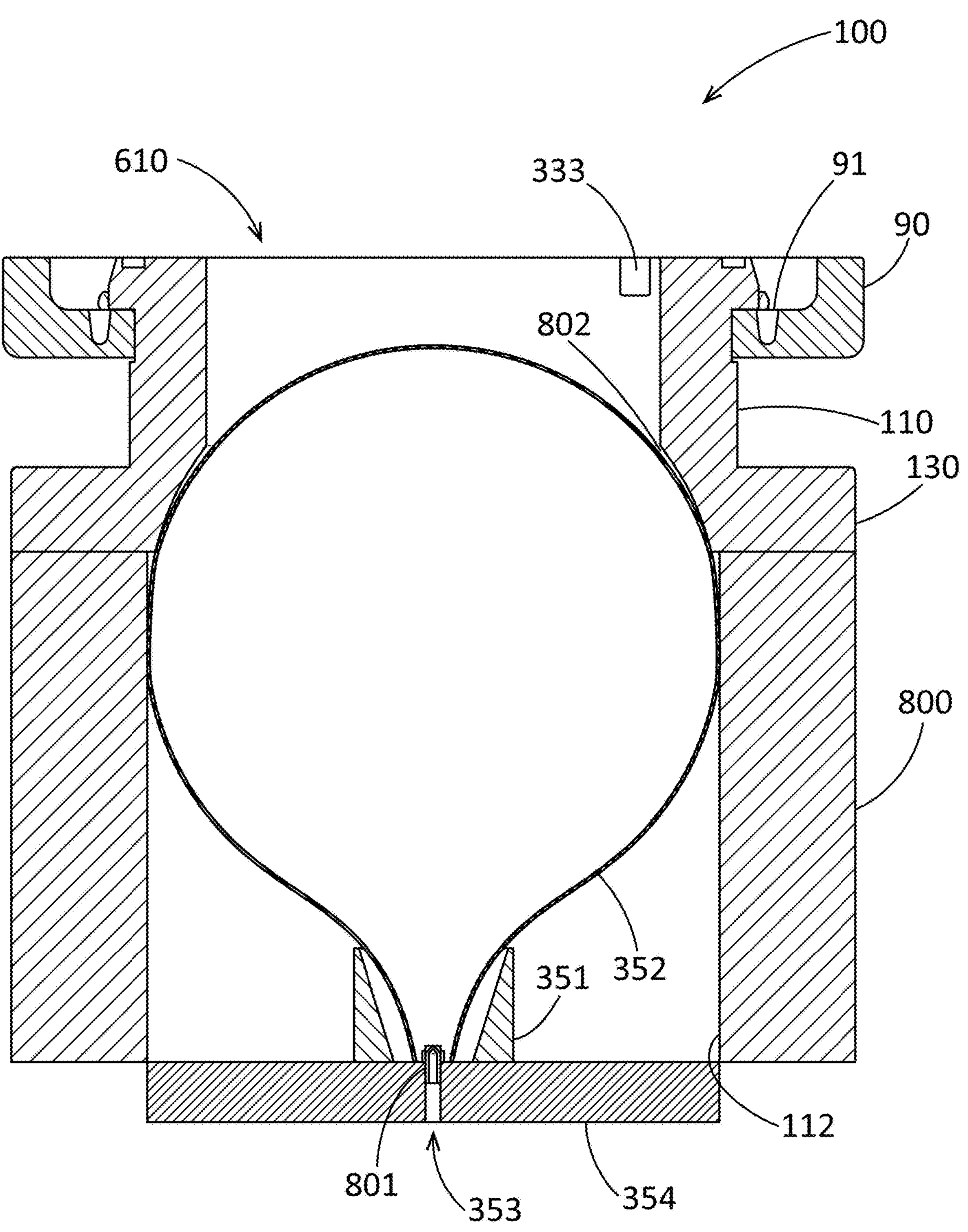
FIG. 13 is a front sectional view of the break check valve and expansion device of FIG. 11 shown in the closed position with the expansion device engaged.

Turning now to FIG. 13, the expansion device 300 of the break check valve 100 can be in the closed position after a dislocation event. When the expansion device 300 of the break check valve 100 is in the closed position, fluid flow can be substantially discontinued through the break check valve 100. When the expansion device 300 is in the closed position, fluid can enter the bladder 352 via the fluid passage 353. The bladder 352 can be configured to expand when the expansion device 300 is in the closed position. For example, when the expansion device 300 is in the closed position, fluid can enter the bladder 352 via the fluid passage 353 and cause the bladder 352 to expand. The bladder 352 can be configured to expand within the break check valve 100, for example, within one or both of the chamber 800 and the inner cavity 610. In various aspects, when the bladder 352 expands, the bladder 352 can define an expanded diameter. The expanded diameter can be substantially equal to the diameter of the chamber 800 and/or the inner cavity 610. The bladder 352 can be configured to engage the chamber 800 and the inner cavity 610 when expanded. More specifically, when the expansion device 300 is in the closed position and is engaged, the bladder 352 can expand and a portion of the bladder 352 can engage with another portion of the break check valve 100, such as the chamber interior wall 112, the interior surface 113, or the sealing surface 802. When the bladder 352 is expanded, it can be forcibly engaged against the sealing surface 802 of the break check valve 100. In an exemplary aspect, the bladder 352 can be expanded by interior fluid pressure, and a portion thereof can be forcibly engaged against the sealing surface 802. In such an example, the expanded bladder 352 can form a substantially fluid resistant seal against the sealing surface 802. In various aspects, the sealing surface 802 can be a surface defining a curvature which can be substantially equal to a curvature defined by the surface of the expanded bladder 352. In some aspects, the bladder 352 can be sealably engaged with the sealing surface 802 when the break check valve 100 is engaged. The bladder 352 can be configured to discontinue fluid flow through the chamber 800 when expanded and sealably engaged with the sealing surface 802.

A method for using the pipe system fitting 80 or any portion thereof can comprise providing the fitting 80 or any portion thereof as disclosed herein. The method can comprise maintaining an open position of the valve member 700 as long as the fluid of the fitting 80 flows in the positive flow direction of the break check valve 100, wherein a positive direction can be defined as in an upward direction or towards the fitting 80. The method can further comprise automatically rotating the expansion device 300 or telescopic valve member 700 of the break check valve 100 from the open position to the closed position of the break check valve 100 when the fluid of the fitting 80 flows in the negative flow direction, wherein the negative flow direction can be defined at inwardly toward the system, of the break check valve 100. The method can further comprise the expansion device 300 or telescopic valve member 700 during closure changing their respective positions or orientations with respect to the valve body 110 of the break check valve 100. As also shown, the method can comprise the expansion device 300 or telescopic valve member 700 in the closed position of the break check valve 100 substantially stopping or completing stopping flow of the fluid from the system. By "substantially stopping flow," including as shown with respect to exemplary aspects disclosed herein, it is meant that all flow is stopped except for any incidental flow from the valve due to minor gaps between the parts when the valve is closed, any purposeful backflow of the fluid, or purposeful venting or streaming of water as described herein-such as through the opening 355 for example, to alert passersby of a problem with the fitting 80. In some aspects, leakage due to gaps and any purposeful venting of water as described can measure less than 5% of total flow.

The method can comprise expelling a limited stream of water from the break check valve 100 through holes such as the opening 355 or fluid bypass 704 when the break check valve 100 is in the closed position to indicate closure of the break check valve 100 and a resulting need for attention and service by appropriate service personnel. In some aspects, the method can comprise expelling a stream of water from the break check valve 100 and through the opening 355 defined in the bladder 352 or the fluid bypass 704 defined in the inner ring 703 of the telescopic valve member 700. For example, the stream of water could be a focused jet extending high enough into the air (a minimum of five feet, in some aspects, to reach above a top of a parked vehicle) for one to notice it. By expelling water from the break check valve 100 when the break check valve 100 is closed, the break check valve 100 can, as noted above, effectively and clearly indicate to passersby that something may be amiss with the fitting 80 and specifically that the fitting 80 may be dislocated from its usual position, giving them and any nearby public safety personnel the ability to notify responsible parties that the fitting 80 requires attention.

The method can comprise installing the fitting 80 at any angular position about the axis 101 with respect to an angular position of the break check valve 100 without affecting the ability of the break check valve 100 to remain closed when the fitting 80 is coupled to the break check valve 100 and open when the fitting 80 is separated from the break check valve 100. This rotation of the fitting 80 to a desirable angular position based on the availability of multiple angular positions is called "clocking" of the fitting 80. The method can comprise re-using the break check valve 100 as-is after actuation of the break check valve 100 and after replacing the fitting 80 (even a new fitting 80, as needed) to the break check valve 100. The method can comprise resetting an existing break check valve 100 or a replacement break check valve 100 without disassembly of any portion thereof such as, for example, the expansion device 300 or, more specifically, the bladder 352. The method can comprise resetting an existing break check valve 100 without disassembly, for example, reversing the telescopic valve member 700 by manually sliding any of the perimeter ring 701, mid ring 702, and inner ring 703 back to an original orientation defined as the orientation of the perimeter ring 701, mid ring 702, and inner ring 703 prior to the dislocation of the fitting 80. The method can comprise, for example, resetting the break check valve 100 in 30 seconds or less. The method can comprise replacing one or more fittings such as, for example and without limitation, the pipe system fitting 80 with a new fitting to improve or otherwise change performance of the system.

In some aspects, the break check valve 100 and various components thereof can be formed from or comprise an iron (including cast iron and ductile iron), bronze, or steel material including stainless steel or even a plastic (e.g., polymeric) or composite material, which can be reinforced with fibers. In some aspects, any suitable materials can be used. In some aspects, the break check valve 100 and various components thereof can be formed using casting and/or machining processes. In some aspects, any suitable processes known in the art can be used. In some aspects, various components of the break check valve 100 can be formed from or comprise a metal such as, for example and without limitation, steel or cast iron. In some aspects, the various components can be formed from any other material, any of which can optionally be corrosion-resistant or replaceable for serviceability. The various components of the break check valve 100 can be formed from any one or more of a variety of manufacturing processes. Components can be fabricated using subtractive manufacturing processes such as machining, forging, or stamping; additive manufacturing processes such as three-dimensional printing or casting; and any other forming and assembly processes such as bending or riveting. Components can be fabricated using multiple of the manufacturing processes cited above.

As shown, the break check valve 100 can be easily replaced by a new break check valve 100, or the break check valve 100 can replace an older style valve or be installed where no break check valve is currently installed. The break check valve 100 can also be reset without replacement or modification upon reinstallation of the fitting 80 by returning the components of the break check valve 100 to their respective original positions.

One should note that positional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such positional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

The invention claimed is:

1. An expansion device for a break check valve that is coupled to a pipeline and to a pipe system fitting, the expansion device comprising:

a valve member configured to move from an open position to a closed position only when the pipe system fitting is separated from the break check valve; and a bladder coupled to the valve member, the bladder defining:

a bladder body, the bladder body defining an interior, the interior being an adjustable volume in response to fluid pressure; and an inlet configured to provide fluid communication between the pipeline located outside the bladder body and the interior of the bladder body.

2. The expansion device of claim 1, wherein the bladder is formed of a substantially elastomeric material.

3. The expansion device of claim 2, wherein the bladder occupies a position within the expansion device when the valve member rotates to the closed position.

4. The expansion device of claim 2, wherein the bladder defines a bladder flange engaged with the valve member.

5. The expansion device of claim 1, further comprising a valve arm mechanically coupled to the valve member and in mechanical communication with the pipe system fitting, the valve arm extending from the valve member and configured to constrain the valve member.

6. The expansion device of claim 1, wherein the pipe system fitting is a wet barrel fire hydrant.

7. The expansion device of claim 1, wherein the bladder occupies a position superjacent to the expansion device when the valve member is in a respective closed position.

8. The expansion device of claim 1, wherein the bladder further comprises an opening disposed about a spherical surface of the bladder.

9. The expansion device of claim 8, wherein the opening is a pinhole.

10. The expansion device of claim 1, wherein the valve member is configured to engage an interior surface of the break check valve in substantially sealed relationship.

11. The expansion device of claim 1, wherein the bladder is configured to engage with an interior surface of the expansion device in substantially sealed relationship.

12. The expansion device of claim 1, wherein the inlet further comprises a nozzle, wherein the nozzle is configured to regulate fluid flow.

13. The expansion device of claim 1, wherein a portion of the valve member extends upwardly and surrounds a portion of the bladder.

14. The expansion device of claim 1, wherein the valve member is configured to hingedly connect to the break check valve.

15. The expansion device of claim 1, wherein the valve member is configured to rotate from the open position to the closed position only when the pipe system fitting is separated from the break check valve.

16. The expansion device of claim 1, further comprising a bladder housing coupled to the valve member.

17. The expansion device of claim 16, wherein the bladder extends at least partly through the bladder housing, the bladder being nested or partially nested within a hollow interior of the bladder housing prior to a closure of the expansion device.

18. The expansion device of claim 16, wherein the bladder housing defines a tapered sidewall.

19. A method of using a break check valve that is coupled to a pipe system fitting, the method comprising:
- keeping the break check valve open when the pipe system fitting remains coupled to the break check valve;
- initiating closure of the break check valve upon decoupling of the pipe system fitting from the break check valve by movement of a valve member; and
- expanding a bladder of the break check valve after closure of the valve member of the break check valve.

20. The method of claim 19, further comprising signaling to a user an activation of the break check valve upon the closure of the valve member.

21. The method of claim 20, wherein a portion of the break check valve is configured to extend above a mating surface of the break check valve after the closure of the break check valve.

22. The method of claim 19, further comprising the step of resetting the break check valve after the closure of the valve member.

23. A break check valve comprising:
- a valve body;
- a valve member coupled to the valve body and configured to move from an open position to a closed position only when a pipe system fitting is separated from the break check valve; and
- a bladder coupled to the valve member, the bladder defining:
  - a bladder body, the bladder body defining an interior, the interior being an adjustable volume in response to fluid pressure; and
  - an inlet configured to provide fluid communication between a pipeline located outside the bladder body and the interior of the bladder body.

24. The break check valve of claim 23, further comprising a valve arm mechanically coupled to the valve member and in mechanical communication with the pipe system fitting, the valve arm extending from the valve member and configured to constrain the valve member, a portion of the valve arm is received by a notch in the break check valve when the valve member is in the open position.

25. The break check valve of claim 24, wherein the valve arm is mechanically constrained in the notch by the pipe system fitting thereby retaining the valve member in the open position.

26. The break check valve of claim 23, wherein the valve member is hingedly connected to the break check valve.

27. The break check valve of claim 23, wherein the valve member is configured to rotate from the open position to the closed position only when the pipe system fitting is separated from the break check valve.

28. The break check valve of claim 23, further comprising an elongated valve member arm configured to retain the valve member in the open position prior to when the pipe system fitting is separated from the break check valve.

29. The break check valve of claim 23, further comprising a chamber defining a sealing surface against which the bladder is configured to seal when the pipe system fitting is separated from the break check valve.

30. The break check valve of claim 29, wherein the sealing surface defines a curvature in cross-section.

* * * * *